June 15, 1948.　　　　R. L. WILSON　　　　2,443,437
TIME-DELAY RELAY SYSTEM
Filed Oct. 12, 1943　　　　　　　　　　　　7 Sheets-Sheet 3
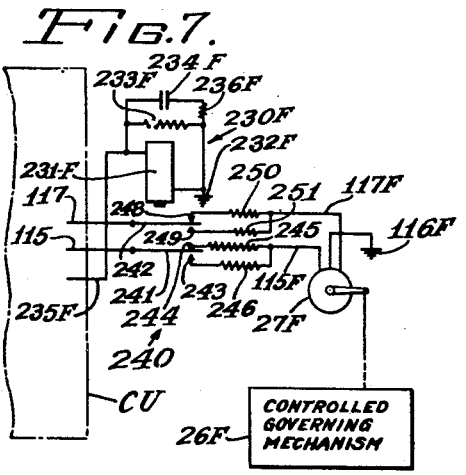
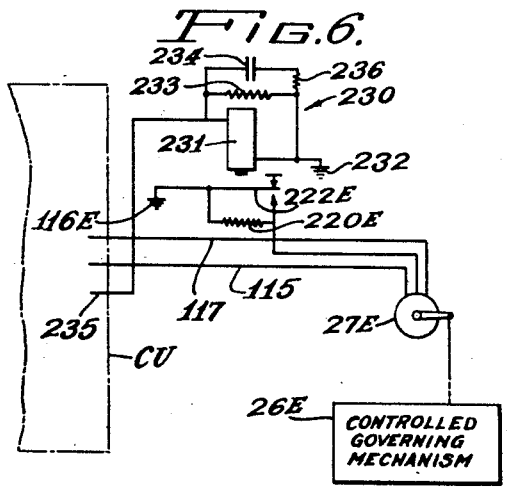
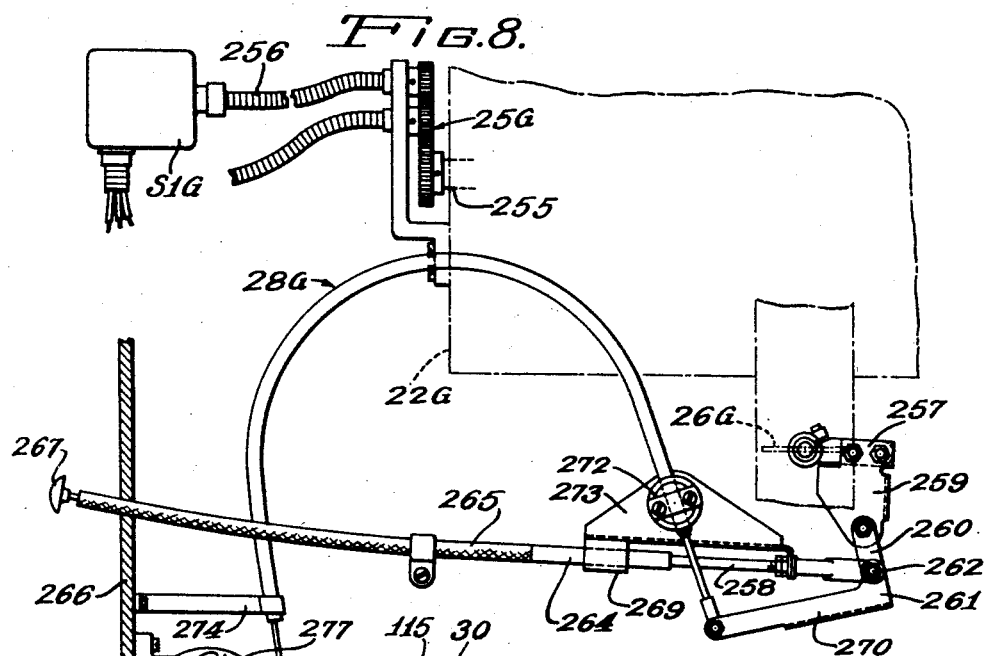
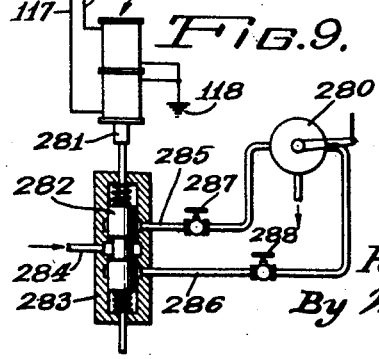
Inventor:
Rosser L. Wilson
By Wallace and Cannon
Attorneys June 15, 1948.  R. L. WILSON  2,443,437
TIME-DELAY RELAY SYSTEM
Filed Oct. 12, 1943  7 Sheets-Sheet 4
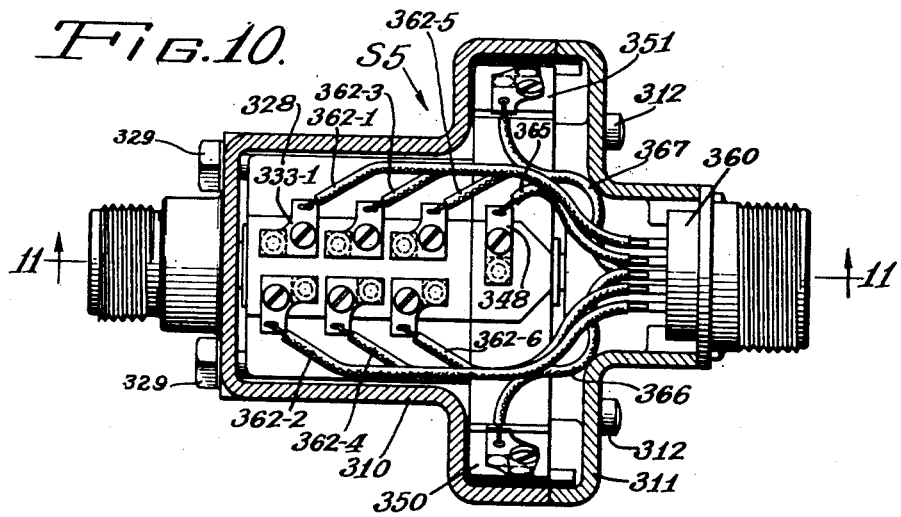
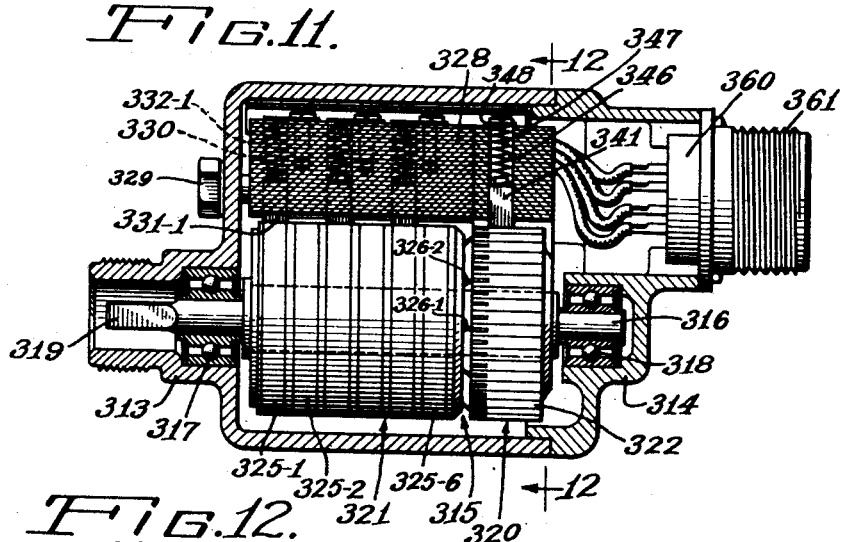
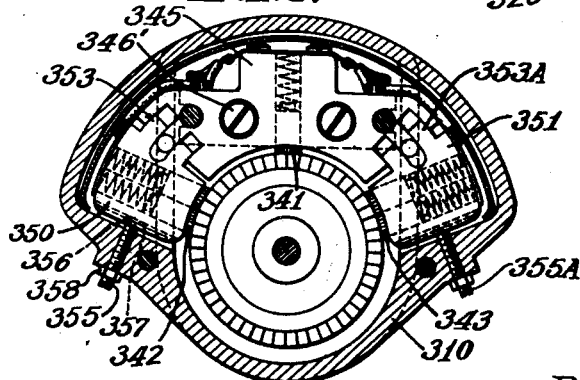
Inventor:
Rosser L. Wilson
By Wallace and Cannon
Attorneys

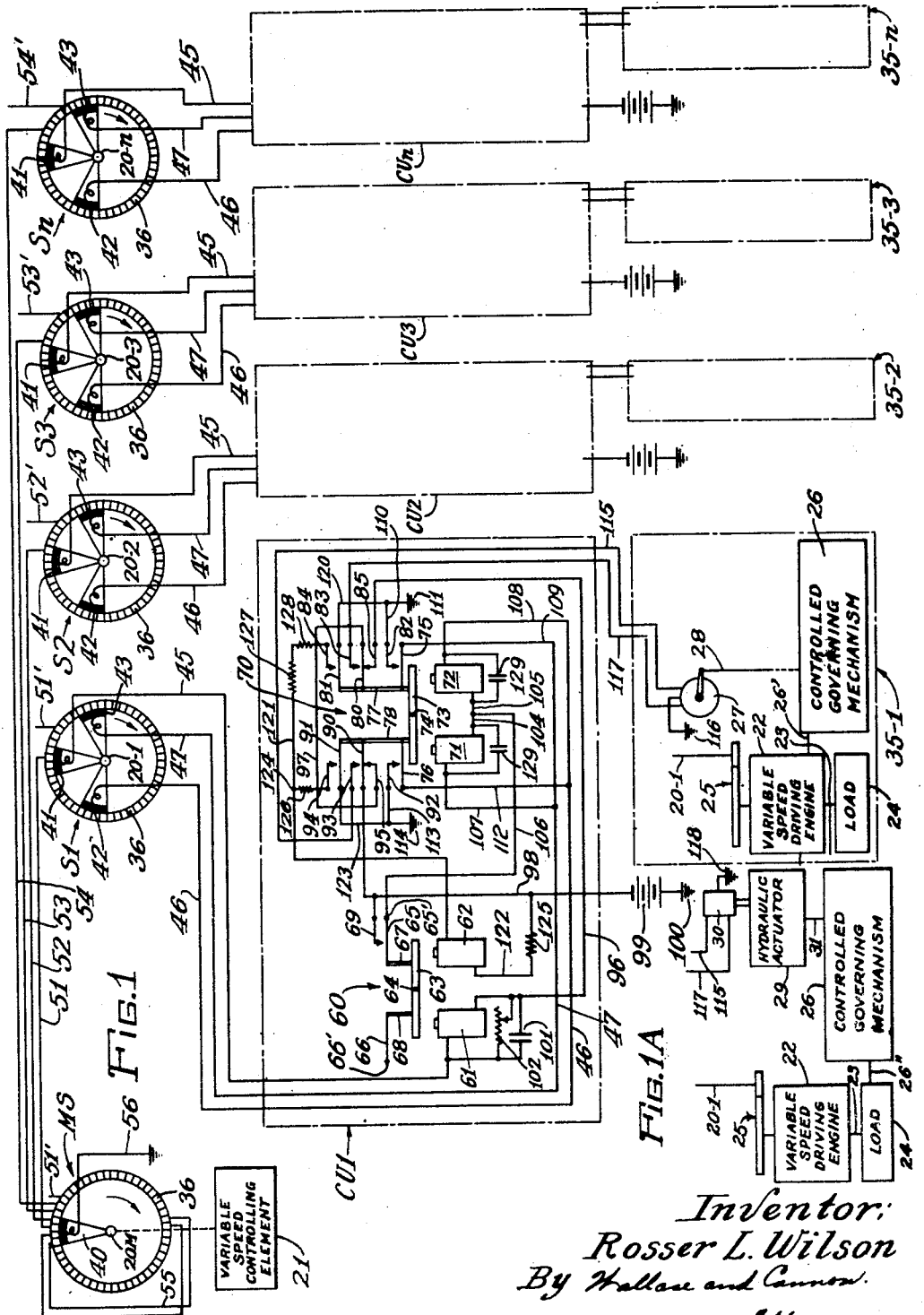

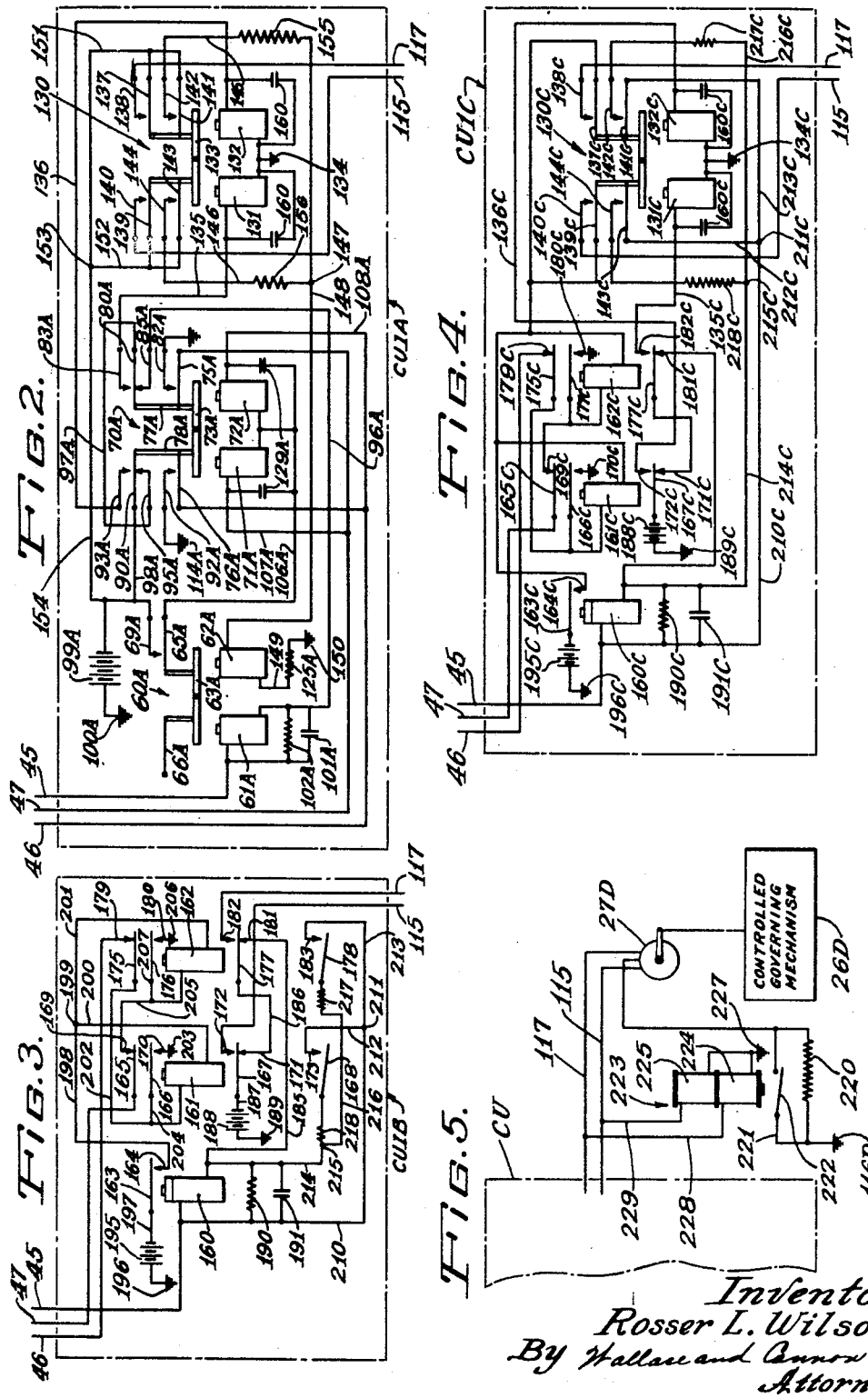

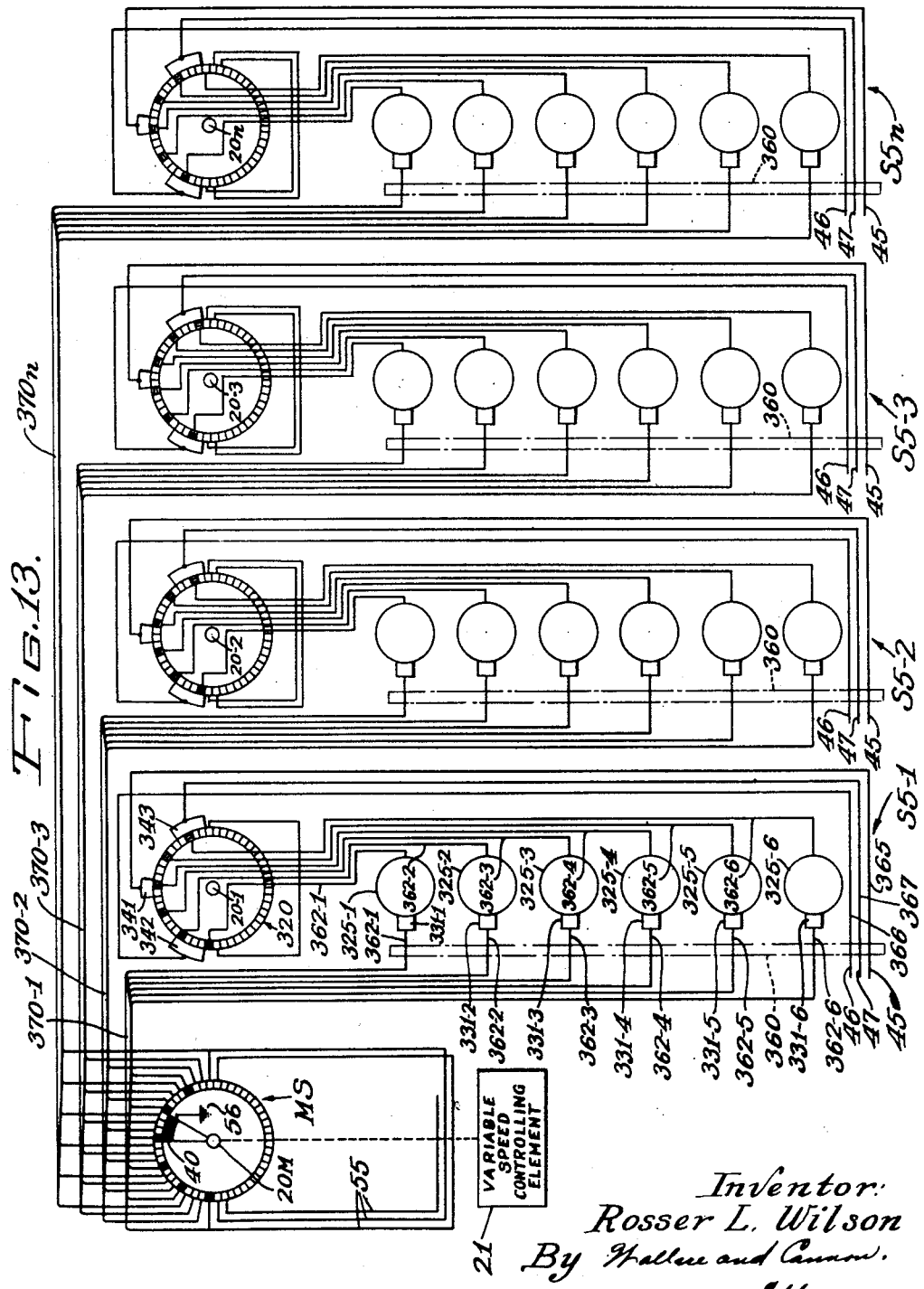

June 15, 1948.  R. L. WILSON  2,443,437
TIME-DELAY RELAY SYSTEM
Filed Oct. 12, 1943  7 Sheets-Sheet 6
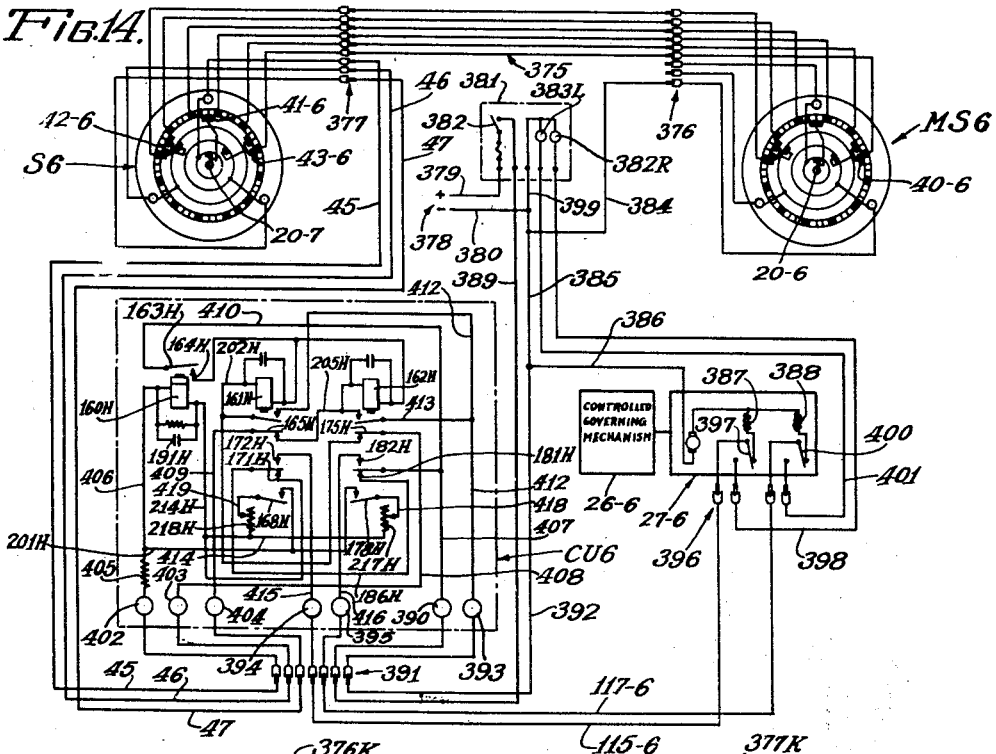
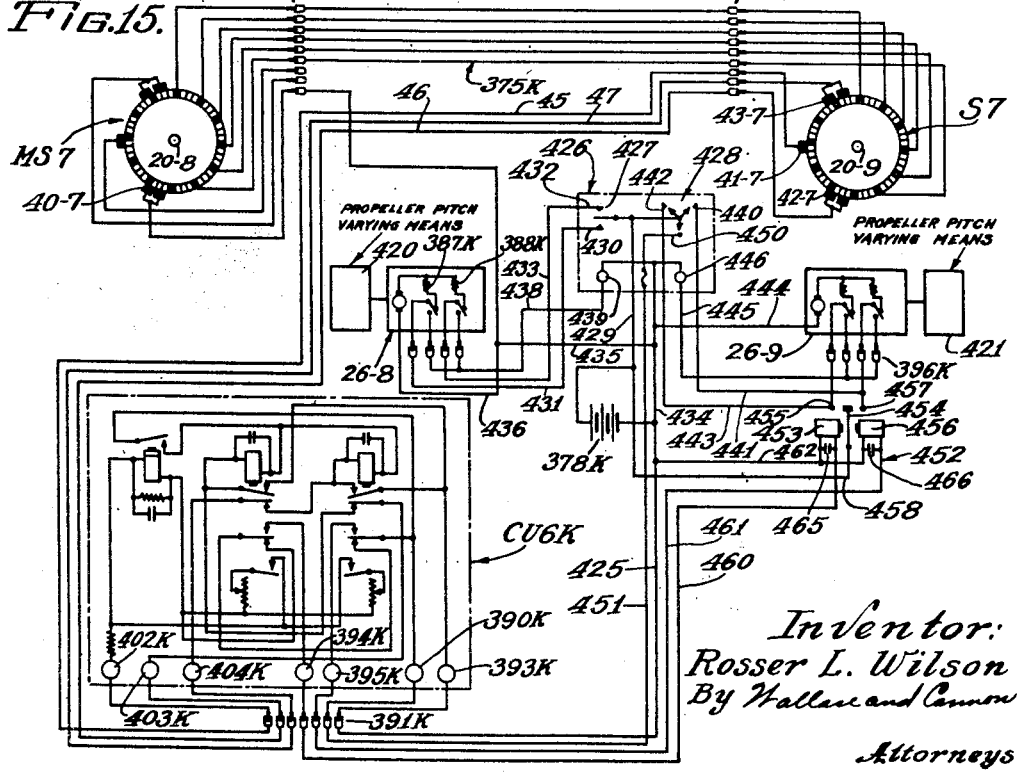
Inventor:
Rosser L. Wilson
By Wallace and Cannon
Attorneys June 15, 1948.  R. L. WILSON  2,443,437
TIME-DELAY RELAY SYSTEM
Filed Oct. 12, 1943  7 Sheets-Sheet 7

Inventor:
Rosser L. Wilson
By Wallace and Cannon
Attorneys

Patented June 15, 1948

2,443,437

UNITED STATES PATENT OFFICE 2,443,437

TIME-DELAY RELAY SYSTEM

Rosser L. Wilson, Mahwah, N. J., assignor to American Brake Shoe Company, New York, N. Y., a corporation of Delaware Application October 12, 1943, Serial No. 505,938

13 Claims. (Cl. 175—320)

This invention relates to control apparatus for use in governing the relative speeds of moving parts of machinery such as shafts and the like, and particularly it relates to such control apparatus for establishing and maintaining a substantially synchronous or other desired speed relationship between two or more such moving parts such as two or more rotating shafts which otherwise would operate independently of each other.

The need for control apparatus of the aforesaid character may arise in any situation where it is desirable that the variety adjustable operating speed of a particular member, such as a shaft, serves as a standard with which the operating speed of one or more other independently driven shafts or the like is to be correlated. In such instances the shaft which is to constitute the standard may serve merely as a variable speed control shaft for one or more engines, motors or the like, or it may constitute the shaft of a master engine or motor of a group of two or more similar engines or motors which are to be operated in a correlated relationship.

The use of one or more engines as the driving power for an airplane affords one typical situation where control apparatus of the aforesaid character is desirable, for whether the airplane be driven by a single engine, or by two or more similar engines, the maintenance of the desired speed of operation in such engine or engines is extremely difficult because of the rapid and extremely wide variance of the factors such as wind resistance, attitude of flight or the like, which affect and vary the operating speed of such engine or engines. Thus, in a single engine airplane, a variable speed electric motor may be used as a standard from which the speed of operation of the single engine may be automatically governed by control apparatus of the aforesaid character; while in an airplane having a plurality of engines, such control apparatus may serve to coordinate the speed of all of the engines with the speed of such a variable speed electric motor, or if desired, a particular one of the engines may serve as the variable standard of speed, and such control apparatus may serve to coordinate the speed of the other engines with the one engine which in such an event constitutes the standard or master engine. It is therefore an object of this invention to enable automatic yet adjustable control of the speed of one or more engines to be attained in such a manner that control of the speed thereof is simplified, and if desired the control of the speed of all of the engines of a multimotored airplane may be adjusted through manipulation of but a single control means.

Where such control apparatus is used as aforesaid to control the operating speed of one or more airplane engines, it is of course desirable that the apparatus be rugged in character, relatively light in weight, and dependable and accurate in its operation or correlation of the secondary shafts or engines with the master shaft, and in the patent to Wilson, No. 2,232,753, patented February 25, 1941, several forms of control apparatus are disclosed which meet these fundamental requirements. It is, however, an important object of this invention to enable further improvement of the operating characteristics of such control apparatus to be attained, and further objects related to the foregoing are to enable the weight of such control apparatus to be even further reduced, and to enable the desired accuracy of speed correlation or control to be attained under varying circumstances which may involve variations in the nature of the equipment to be controlled as well as varying conditions of use.

Control apparatus of the aforesaid character attains the desired speed correlation through the control of power operated speed adjusting mechanism which, upon detection of undesired speed variance, acts to adjust the speed of the secondary shaft or the like in such a sense as to tend to re-establish the desired speed relationship. As a practical matter, the power operated speed adjusting means may be arranged to attain the speed adjustment in different ways which are determined to a great extent by the field in which the apparatus is used. For example, in an airplane engine, the speed may be varied by adjustment of the pitch of the propeller driven thereby, or by adjustment of the fuel supply means such as a carburetor, or by adjustment of other means which affect engine speed. Where resort is had to the adjustment of the propeller pitch, the power means for operating the same may in many instances constitute a standardized part of the equipment to which the control apparatus as a whole must be related and adapted so as to attain the desired accuracy of speed correlation.

In the operation of control apparatus of the kind to which this invention relates, the detection of an undesired speed variance by the detecting means of the apparatus causes a control impulse to be transmitted to the speed adjusting means of the shaft which is being controlled thereby, and the characteristics of such control impulses, such as the length and frequency thereof, have a controlling influence upon the operation of the speed adjusting means and its effectiveness in re-establishing the desired speed relationship. Thus, when different speed adjusting means are encountered, the characteristics of the control impulses transmitted thereto by the control apparatus must be suited to the characteristics of the particular speed adjusting means in order that such speed adjusting means may accomplish the desired speed correlation, and to enable this to be readily accomplished is an important object of this invention. An object related to the foregoing is to simplify the inter-relationship or matching of the detecting means and the speed adjusting means in control apparatus of the foregoing character.

In the control apparatus disclosed in the aforesaid patent, the detection of the undesired speed differential between a master shaft and one or more secondary shafts is accomplished through commutator switch devices associated with the respective shafts so as to compare the speeds of the master and secondary shafts and transmit energizing impulses in succession along different electrical paths to associated relay switch mechanism, and this relay switch mechanism, in accordance with the order or sequence in which such impulses are received from such electrical paths and in accordance with the time spacing of such impulses, is operable to determine whether the speed differential between the compared shafts exceeds the allowable tolerance and in which sense a corrective adjustment must be applied to the secondary shaft to re-establish the desired speed relationship; and upon such determination one or more control impulses are transmitted to the speed adjusting means to cause corresponding periods of corrective speed adjustment in the required direction or sense. The relay switch mechanism of the aforesaid patent is such that it includes a first or master relay which is of the slow-to-release type, and when a speed differential between the two compared shafts causes this relay to be momentarily energized, the contacts of this master relay remain closed for a predetermined delay period determined by the release time of the relay. Two secondary relays are also included in the aforesaid relay switch mechanism, and depending on the sense of the existing speed variance or differential, a circuit to one of these secondary relays may next be closed through the commutator switches. If such circuit closure takes place during the delay period of the slow-to-release or master relay, the corresponding secondary relay will be actuated, and during the balance of the release period of the master relay a control circuit will be completed to the speed adjusting means to cause operation thereof in the proper sense or direction.

The maintenance of the speed relationship of a master shaft and a secondary shaft within a predetermined tolerance by control apparatus of the character to which this invention relates is of course dependent upon the ability of the detecting means of such apparatus to detect relatively small variation in the speed relationship of such shafts, to thereby enable correction to be made before the speed differential become objectionally large, and in the control apparatus of the aforesaid patent, the sensitivity of the apparatus to small speed differences may be increased by increasing the release time of the master relay of the relay switch mechanism. Under many conditions resort may be had to such increase or other adjustment of the release time of the master or slow-to-release relay to attain the desired sensitivity of the apparatus, but in the application of the control apparatus to different types of mechanism, conditions may arise where the extended period of closure which is necessary for the master relay in order to attain added sensitivity will so extend the period of corrective adjustment as to cause overcorrection which cannot be detected until after the master relay has released. It is, therefore, a further object of this invention to enable sensitivity of such apparatus to be attained in such a manner that reversal of the sense of relative rotation of two such shafts may be quickly detected; and an object related to the foregoing is to enable the normal release time of the master relay in control apparatus of the foregoing character to be materially extended without destroying or objectionably limiting the ability of the apparatus to detect reversal of the sense of relative rotation of the two shafts. More specifically it is an object of the invention to enable the normal release time of the master relay of such control apparatus to be relatively long so as to impart extreme initial sensitivity to the apparatus, and to enable such release time to be reduced as an incident to the detection of a speed difference which requires correction, thereby to render the apparatus more quickly sensitive to reversal of the sense of relative rotation of the two shafts.

Another object related to the foregoing is to enable such control apparatus to detect reversal of the sense of relative rotation of a master shaft and a secondary shaft during the performance of a speed adjusting operation, and to enable the speed adjusting operation to be shortened, terminated and reversed in response to such detection of reversal of the sense of relative rotation.

A further problem encountered in the use of control apparatus of the aforesaid character centers about the inherent conditions which make the engine or other shaft-driving means more responsive to correction in one direction than in the other, for it will be clear that because of the load or other resistance which is usually effective upon a driven member or shaft, a reduction in the speed of the shaft may be effected more easily and quickly than an increase of the shaft speed. It is therefore a further object of this invention to enable control apparatus of the aforesaid character to compensate for such differences in the responsiveness of the controlled mechanism to speed correction in opposite directions, thereby to further increase the accuracy of correlation attained by the apparatus. This aspect of the present apparatus is shown and claimed in my copending application Serial No. 774,081, filed September 15, 1947, and which is a division of the present application.

While control apparatus of the kind to which this invention relates operates under normal service conditions to maintain the speeds of the compared members or shafts within the operating tolerance for which the apparatus is designed, it must be recognized that circumstances may arise where the speed difference is relatively great, and to enable such apparatus to establish or re-establish the desired speed relation under such conditions is a further object of this invention. When such a great speed differential is present it is usually quite important that the desired speed relationship be re-established as rapidly as possible, and to enable this to be accomplished in control apparatus which operates within a small tolerance is another important object of the invention. Further and related objects of the invention are to render the rate of correction of the speed of the master shaft dependent upon the magnitude of the existing speed differential, and to enable the rate of such correction to be varied not only in accordance with the direction in which the correction is to be applied.

Further objects of the invention are to enable the weight of the commutator switch devices to be materially reduced, to obtain greater uniformity of contact or brush action in such switch devices, and to enable the angles between the brushes of such switch devices to be readily varied and adjusted so as to match the performance characteristics of the control apparatus to the mechanism which is to be controlled thereby; and an object related to the foregoing is to accomplish these results through the provision of a commutator switch device wherein the commutator brushes are disposed in stationary relationship about a rotating commutator.

Other and further objects of the present invention will be apparent from the following description and claims and are illustrated in the accompanying drawings which, by way of illustration, show preferred embodiments and the principle thereof and what is now considered to be the best mode of applying that principle. Other embodiments of the invention embodying the same or equivalent principle may be used and structural changes may be made as desired by those skilled in the art without departing from the present invention and the purview of the appended claims.

In the drawings:

Fig. 1 is a schematic wiring diagram illustrating a control apparatus embodying the features of the invention and adapted for correlating the speed of one or more secondary shafts with the speed of a master shaft;

Fig. 1A is a fragmentary view of an alternative form of apparatus that may be utilized in place of a portion of the apparatus shown in Fig. 1;

Fig. 2 is a wiring diagram illustrating another embodiment of control unit that may be utilized in the control apparatus of Fig. 1;

Fig. 3 is a wiring diagram illustrating still another control unit that may be utilized in the control apparatus of Fig. 1;

Fig. 4 is a wiring diagram illustrating another form of control unit embodying the invention and adapted to be used in the control apparatus of Fig. 1;

Fig. 5 is a fragmental wiring diagram illustrating means whereby the controlling action attained with the apparatus of Figs. 1, 2, 3 and 4 may be further refined;

Fig. 6 is a fragmental wiring diagram showing means whereby accuracy of control attained by the control apparatus of Figs. 1, 2, 3, or 4 may be increased;

Fig. 7 is a fragmental wiring diagram showing another form of means for increasing the accuracy of control attained by the mechanism of Figs. 1 to 4;

Fig. 8 is a fragmental vertical sectional view illustrating one form of controlled governing mechanism to which the control apparatus of the present invention may be applied;

Fig. 9 is a diagrammatic view illustrating another form of actuator which may be utilized;

Fig. 10 is a longitudinal sectional view illustrating a novel commutator switch involving certain features of the present invention and which may be utilized under the present invention in control apparatus such as that shown in Fig. 1;

Fig. 11 is a cross sectional view taken along the line 11—11 of Fig. 10;

Fig. 12 is a cross sectional view taken along the line 12—12 of Fig. 11;

Fig. 13 is a wiring diagram illustrating the manner in which the commutator switch device of Figs. 10 to 12 may be incorporated in control apparatus such as that shown in Fig. 1;

Figs. 14 and 15 are schematic wiring diagrams illustrating further embodiments of the invention;

Fig. 16 is a schematic wiring diagram illustrating control apparatus embodying the present invention and utilized to control and vary the speed of a single variable speed engine or the like;

Fig. 16A is a fragmentary view of an alternative form of apparatus that may be utilized in place of a portion of the apparatus shown in Fig. 16;

Fig. 16B is a schematic view of an alternative form of speed varying mechanism that may be associated with the motor shown in Fig. 16; and Fig. 17 is a view taken along the line 17—17 of Fig. 16.

In the various embodiments of the invention chosen for disclosure herein the invention is particularly adapted for governing the speed of one or more engines of an airplane, but it will be recognized that these embodiments of the invention are of general utility, and may be effectively employed in any circumstance where correlation of the speeds of two or more rotating and independently driven shafts is desired. Thus in the embodiment of the invention illustrated in Fig. 1 of the drawings, a plurality of shafts 20M, 20—1, 20—2, 20—3 and 20—n are shown, and means are provided for correlating the speeds of these shafts so that one of the shafts, as the shaft 20M, constitutes the master shaft, and the other shafts 20—1, 20—2, 20—3 and 20—n are maintained at speeds which bear a predetermined relationship to the master shaft 20M. This predetermined relationship may, as in the present case, be a substantially synchronous relationship, or, by the use of gearing, any other desired speed relationship between two or more shafts or the like may be maintained.

In the attainment of the desired speed relationship between the several shafts, the master shaft 20M is driven at the desired speed by driving means such as a variable speed controlling element 21 which may take any desired form such as a variable speed electric motor or a variable speed engine. Thus, as illustrated in Fig. 1 of the drawings, it is contemplated that the master shaft 20M will serve merely as a standard or master shaft with which the speeds of the other or secondary shafts 20—1, 20—2, 20—3 and 20—n are to be correlated, and hence the variable speed controlling element 21 may be in the form of a relatively small variable speed electric motor. The other or secondary shafts 20—1, 20—2, 20—3 and 20—n, may be driven by individual variable speed driving internal combustion engines such as the engine indicated at 22 in Fig. 1, which may take the form of an airplane engine operating through its main shaft 23 to drive a load 24 such as an airplane propeller. The drive from the engine shaft 23 to the related shaft 20—1 may, of course, be direct, or as in the present instance, may be attained through gearing 25.

The speed of each such engine, and hence of the associated shaft as 20—1, may be varied by adjustment of the load or the propeller pitch, or by adjustment of the fuel supply means, and this may be accomplished by operation of conventional speed governing means such as the mechanism of a variable pitch propeller, or by operation or adjustment of the fuel pump or carburetor of the engine. Thus in Fig. 1 of the drawings such governing mechanism is indicated generally as 26, and it is by automatic operation or adjustment of such governing mechanism 26 that the desired correlation of the secondary shaft 20—1 with the master shaft 20M is attained under the present invention. The governing mechanism 26 is, of course, adjustable in two directions so as to enable the speed of the secondary shaft 20—1 to be increased or decreased in accordance with the sense of the variance between the speeds of this shaft and the master shaft 20M, and such actuation may be effected in different ways, as, for example, by a reversible electric motor 27 having an operating connection 28 with the speed governing mechanism 26, and in Fig. 1 the speed adjusting means may be taken as being a fuel adjusting means and is therefore shown as being connected to the engine at 26'.

It will be understood that the reversible electric motor 27 and the parts associated therewith are illustrative of an arrangement to which resort may be had for the effecting operation of the governing mechanism 26 and as a further example of means which may be employed for this purpose, resort may be had to the arrangement shown in Fig. 1A wherein a two-way hydraulic actuator 29 is provided which is controlled by a two-way solenoid valve operator 30, the hydraulic actuator 29 being connected to the governing mechanism 26 through a connection as 31, and the governing mechanism 26 is in this instance associated at 26" with the load 24 so as to adjust the speed of the engine 22 by variation of the load, such adjustment of the load being attained by adjustment of the propeller pitch. Moreover, it will be evident that the electric motor 27 may be utilized for adjustment of the propeller or other load, or the hydraulic means 29 may be arranged in some instances so as to adjust a fuel supply means and thereby adjust the engine speed.

The mechanism which has thus been described for driving the secondary shaft 20—1, and for adjusting the speed at which the shaft 20—1 is driven, may be said to constitute a driving and speed adjusting unit 35—1 for the secondary shaft 20—1, the elements which make up such unit being clearly indicated in Fig. 1 by being included within a block defined by dot-dash lines and indicated by the reference character 35—1; and similar driving and speed adjusting units 35—2, 35—3, 35—n, similarly associated with the secondary shafts 20—2, 20—3 and 20—n, respectively, have been illustrated in Fig. 1 by blocks bearing such reference characters.

Under the present invention the speed of each secondary shaft as 20—1 is compared with the speed of the master shaft 20M to detect the presence and sense of any undesired variance between the speeds of the secondary shafts and the master shaft, and upon such detection of undesired speed variance in respect to a particular secondary shaft, the speed governing means of the associated engine is adjusted in a controlled manner in the direction required to re-establish the desired speed relationship. In accomplishing such adjustment an individual control unit CU1 is provided which governs the operation of the motor 27 of the unit 35—1; and similar control units CU2, CU3, and CUn are similarly provided for and associated with the units 35—2, 35—3 and 35—n, respectively. Such control units CU1, CU2, CU3 and CUn are, in turn, associated with detecting means whereby the speeds of the respective secondary shafts are compared with the speed of the master shaft 20M, and such detecting means include a plurality of commutator switches MS, S1, S2, S3 and Sn associated respectively with the shafts 20M, 20—1, 20—2, 20—3 and 20—n. Each such commutator switch includes a circularly arranged series of commutator bars 36 and one or more brushes adapted for cooperation with such commutator bars 36. As shown in Fig. 1 the commutator bars 36 constitute the stationary parts of the switches, while the rotating parts of the switches are afforded by the brushes thereof, and hence the brushes of the respective commutator switches are arranged to be driven by the shafts with which their commutator switches are associated. Thus the master commutator MS has a single brush 40 driven by the shaft 20M, while the commutator switch S1 has three angularly spaced brushes 41, 42 and 43 driven as a unit from the secondary shaft 20—1. Each commutator switch S2, S3 and Sn is provided with similar brushes 41, 42 and 43 driven in each instance by the respective one of the secondary shafts with which the particular commutator switch is associated.

The three brushes 41, 42 and 43 of each secondary commutator switch, as S1, are associated with the related control unit, as CU1, by means including wires 45, 46 and 47 which are extended respectively from the brushes 41, 42 and 43 through conventional slip ring connections and selected commutator segments of each secondary switch are so connected with different selected segments of the master commutator MS that when the speed of a secondary shaft varies so as to cause relative rotation to exist between that shaft and the master shaft 20M, circuits will be established to the wires 45, 46 and 47 in a sequence which depends upon the sense of such relative rotation and at a frequency dependent upon the magnitude of such relative rotation. In attaining this result the successive commutator bars 36 of the master commutator MS are allocated in succession to the respective secondary commutator switches and are electrically connected to correspondingly positioned commutator bars of the secondary commutator switch to which they are allocated. Where the master commutator switch is to be associated with four secondary commutator switches, as in the form shown in Fig. 1 of the drawings, the master commutator bars 36 may be considered as being divided into successive groups each including four commutator bars, and the connections for one such group are shown in detail in Fig. 1. Thus, the upper bar 36 just to the right of the vertical center line of the master commutator MS may be considered as the first one of such a group, and a wire 51 connects this bar to the correspondingly positioned commutator bar of the commutator switch S1. The second bar of such a group, that is next bar 36 of the master commutator MS, in a clockwise direction, is connected by a wire 52 to the correspondingly positioned bar of the commutator switch S2; while the third and fourth bars of the group are connected by wires 53 and 54 to corresponding commutator bars of the switches S3 and Sn respectively. In the present instance each annular series of commutator bars is so arranged that each bar 36 is electrically connected to the diametrically opposite commutator bar, as by wires 55, so that where each commutator contains but forty-eight bars, as in the present case, master commutator contains but six groups of bars of four bars each which must be connected in the manner hereinabove described. Thus, the first bar 36 of the next group has a wire 51' extended therefrom to the corresponding segment of the switch S1; so that in the switch S1 three dead or unused commutator bars are disposed between those bars which are connected to the wires 51 and 51'. The other connections between the master commutator and the respective secondary commutators are made in the manner described so that, within 180° of the circumference of each secondary commutator, six equally spaced commutator segments are connected to correspondingly positioned bars of the master commutator.

Where diametrically opposite commutator bars are electrically interconnected as in the embodiment shown in Fig. 1, the brushes 41, 42 and 43 of each secondary commutator switch as S1 are arranged so as to lie entirely within 180° of the circumference of the commutator. This assures completion of the circuits to the wires 45, 46 and 47 in the desired manner, and avoids false indications of relative rotation or sense of such relative rotation.

To provide for such completion of electrical circuits through the respective brushes 41, 42 and 43 and the master brush 40, a ground connection 56 is provided from the master brush 40, and the wires 45, 46 and 47 from the respective secondary commutator switches are extended to the related control units as CU1. Since all of these control units in Fig. 1 are of similar construction, the specific description of such construction and of the relationship to the secondary commutator switches and to the controlled mechanism will be confined to the control unit CU1. Thus, the control unit CU1 includes a pair of balanced relays 60 and 70, the relay 60 having a pair of actuating coils 61 and 62 adapted to act upon opposite ends of a balanced armature 63 which is centrally pivoted at 64 in symmetrical relation with respect to the two coils 61 and 62. The armature 63 is yieldingly urged toward the neutral position shown in Fig. 1, and this is accomplished in the present instance by a pair of normally aligned spring members 65 and 66 which are anchored at their remote ends at 65' and 66'. At its other end the spring member 65 acts through an insulating member 67 to urge the adjacent end of the armature 63 downwardly toward the actuating coil 62, while the other end of the spring member 66 acts in a similar manner through an insulating member 68 to urge the other end of the armature 63 downwardly toward the actuating coil 61. Thus the two opposed or balanced springs 65 and 66 tend to maintain the armature 63 in its neutral position as shown in Fig. 1.

In the present instance the spring member 65 serves also as a relay contact which is normally separated from an opposing contact 69, but when the relay coil 61 is energized, the armature is rocked in a counterclockwise direction so as to elevate the right hand end of the armature and thereby engage the contacts 65 and 69.

The other balanced relay 70 is of generally similar construction in that it has two actuating coils 71 and 72 arranged to act on opposite ends of an armature 73 which is centrally pivoted at 74. Similar springs 75 and 76 act through insulating members 77 and 78 respectively to urge the opposite ends of the armature 73 downwardly, thereby to impart the desired balanced characteristics to the armature 73. In the relay 70, however, a plurality of relay contacts are associated with each of the insulating members 77 and 78. Thus, on the right hand side of the relay 70 a switch pile is provided wherein the spring member 75 constitutes one of three movable switch or relay contacts of similar form. Thus two additional spring contacts 80 and 81 are associated with the insulating member 77 for upward actuation thereby when the armature is actuated in a counterclockwise direction. Stationary relay contacts 82, 83 and 84 of the spring type are disposed respectively above the movable contacts 75, 80 and 81 in normally spaced relation thereto, while a similar stationary relay contact 85 is disposed beneath the movable contact 80 in a normally engaged relation thereto, so that when the relay coil 71 is energized so as to raise the right hand end of the armature 73, the circuit through relay contact 85 is opened, and circuits through the relay contacts 82, 83 and 84 are closed.

On the left hand side of the relay 70 a similarly arranged switch pile is associated with the insulating member 78, to thereby provide movable contacts 90 and 91 connected to the insulating member 78. Stationary relay contacts 92, 93 and 94 of the spring type are disposed respectively above and in normally spaced relation to the movable relay contacts 76, 90 and 91, while a similar stationary relay contact 95 is disposed beneath and in normally engaged relation to the movable relay contact 90. Thus when the left hand end of the armature 73 is elevated due to energization of the actuating coil 72, the circuit through relay contact 95 is broken, and circuits are established through the relay contacts 92, 93 and 94.

The energizing circuit for the relay coil 61 is extended from the brush 41 of the related secondary commutator switch, as S1, by the wire 45 which is connected to one end of the coil 61, and this circuit is continued from the other end of the coil 61 by a wire 96 which extends to the relay contact 85. The relay contact 85 normally engages the contact 80 which is connected to the contact 95 by a wire 97; and thus the circuit is normally extended to the contact 90 which is connected by a wire 98 to one terminal of a source of electrical energy such as a battery 99. The other terminal of the battery 99 is grounded at 100, thereby to complete the energizing circuit for the relay coil 61.

The relay coil 61 of the present embodiment of the invention constitutes the master relay coil of the control unit, and for reasons which will become apparent as the description proceeds, this relay coil 61 is arranged to possess slow-to-release characteristics so as to remain energized, and normally maintain the relay contacts 65—69 closed, for a predetermined period after momentary energization of the relay coil 61. Such slow-to-release characteristics in the relay coil 61 may be attained in different ways, but as herein shown, a condenser 101 is connected across the terminals of the coil 61 to attain this result. Ordinarily, by selection of the proper value for the condenser 101, the desired normal release period may be attained within reasonable limits of accuracy, but to simplify attainment of the desired accuracy of the release period, an adjustable resistance 102 may be connected across the terminals of the coil 61 in parallel with the condenser 101.

The energizing circuits for the actuating coils 71 and 72 are arranged to include the relay contacts 65 and 69 so that neither of these two relay coils may be energized except during an operative period of the master relay coil 61 and to accomplish this, wires 104 and 105 are extended respectively from one terminal of each of the coils 71 and 72 to one end of a wire 106 which is connected at its other end to the relay contact 65. The other terminal of the relay coil 71 is connected to the wire 47 by a wire 107 while the other terminal of the relay coil 72 is connected to the wire 46 by a wire 108 thereby to afford circuits through which the relay coils 71 or 72 may be selectively energized during periods when the contacts 65—69 are closed.

When the relay coil 71 is thus energized, a holding circuit is established therefor, so as to thereafter render the coil 71 independent of the continued completion of a circuit through the brush 43, a wire 109 being extended from the wire 107 to the contact 75, and the contact 82 being connected by a wire 110 to ground at 111. Thus when energization of the relay coil 71 operates to raise the right hand end of the armature 73, the relay contacts 75 and 82 are engaged, and the desired holding circuit for the relay coil 71 is established. This holding circuit, of course, includes the relay contacts 65—69, so that the holding circuit is broken when the armature 63 of the relay 60 returns to its normal position. A similar holding circuit for the relay coil 72 is afforded by a wire 112 extended from the wire 46 to the relay contact 76 and a wire 113 extended from the relay contact 92 to ground at 114. Hence it will be clear that when the relay coil 71 or the relay coil 72 has been energized during the delay period of the relay coil 61, the establishment of the holding circuit for the one of the coils 71 or 72 which has been energized results in this particular coil remaining energized until the master relay contacts 65—69 are opened. It will be observed, of course, that during such period the other coil, as 71 or 72, may be energized, but this does not shift or return the armature 73 or change the condition or relationship of the contacts of the relay 70 so long as the holding circuit remains closed; and such energization cannot take place after the holding circuit of the previously energized coil of the relay 70 has been broken by separation of the contacts 65—69. Such functioning of the apparatus is due to the functional characteristics of the balanced relay 70, for it will be evident that where prior energization of one of the actuating coils has shifted one end of the armature 73 toward the energized coil, this energized coil will continue to exert an attractive force on the armature which will be substantially greater than the attractive force which could be exerted by the other coil in the event it were energized under such conditions.

The manner in which the relay coils of the control unit, as CU1, are energized is thus dependent to the relative positions of the secondary shaft and the master shaft as well as upon the sense and rate of any relative rotational movement which exists therebetween; and the selective positioning of the armature 73 in one actuated position or the other is indicative of the sense of relative rotation which exists between the master and secondary shafts. Hence the condition of the relay 70 is utilized to control the speed governing mechanism 26, and to this end the normally open contacts 83 and 93 of opposite sides of the relay 70 are placed in control of the actuating means such as the motor 27 or the solenoid 30 so as to govern the operation or adjustment of the speed control means in opposite directions. Of these two contacts, the contact 93 is closed when the sense of relative rotation of the shafts indicates that the speed of the secondary shaft is to be reduced, while the contact 83 is closed when the sense of relative rotation indicates that the speed of the secondary shaft is to be increased; and therefore the contact 83 is connected by a wire 117 to one terminal of that field winding of the reversible motor 27 which will drive the motor in such a direction as to increase the fuel supply to the engine 22, it being observed that the common terminal of the two field windings of the motor is grounded as at 116. Thus, closure of the contact 83, when the relay coil 71 is energized, completes a field circuit for the motor from ground at 100 through the battery 99, the wire 98, relay contacts 95 and 90, the wire 97, relay contacts 80 and 83, the wire 117, and through the proper one of the field coils of the motor 27 back to ground at 116. The circuit from the contact 93 to the other terminal of the other field winding of the motor 27 is afforded by a wire 115, so that when the relay contact 93 is engaged by the movable contact 90, an energizing circuit is established to the proper field winding of the motor to reduce the speed of the engine 22.

In the event that the speed governing means is hydraulically actuated, as by means of the hydraulic actuator or motor 29, the control valve thereof is shifted in opposite directions selectively by the two-way solenoid 30; and when such structure is to be used the common terminal of the solenoid 30 is grounded as at 118, and the other ends of the solenoid coils are connected respectively to the wires 117 and 115, as indicated by dotted lines in Fig. 1, so as to cause appropriate valve movement when the control circuits are selectively closed through the contact 83 or contact 93.

As an example of the operation of the structure thus far described it will be assumed that both the master shaft 20M and the secondary shaft 20—1 are rotating in a clockwise direction, as indicated by the arrows in Fig. 1, and that the speed of the secondary shaft 20—1 is slightly greater than that of the master shaft so that the sense of rotation of the secondary shaft is clockwise relative to the master shaft. For descriptive purposes, therefore, the master shaft may be considered as being stationary, with the brush 40 in the position shown, while the secondary shaft 20—1 and the connected brushes are rotating in a clockwise direction. Under such circumstances, the rotation of the brush assembly of the secondary commutator switch will establish a circuit from ground at 56 through the brush 40, the wire 51 and the commutator bars connected thereby, the brush 41, the wire 45, the relay coil 61, the wire 96, relay contacts 85 and 80, the wire 97, relay contacts 95 and 90, the wire 98, and through the battery 99 back to ground at 100. Thus the master relay coil 61 is energized and the armature 63 is rocked in a counterclockwise direction so as to close the relay contacts 65—69. Such energization of the master relay coil 61 continues until the aforesaid circuit is broken, as by the brush 41 passing in a clockwise direction past and out of contact with the commutator bar connected to the wire 51, for during this period of energization the condenser 101 is charged so as to maintain the coil 61 energized and the relay contacts 65—69 closed for the desired delay or release period. Thus during such delay period, the continued closure of the contacts 65—69 conditions the common circuit to the relay coils 71 and 72 so that these relay coils may be selectively energized by the cooperative action of the commutator switches MS and S1.

It may happen, of course, that the speed of relative rotation of the shafts 20M and 20—1 is so slow that the relay coil 61 will become ineffective and the relay contacts 65—69 will be opened prior to the closure of a circuit to one of the secondary relays 71 or 72. Such operation indicates that relative speed of the two shafts is within the allowable tolerance. However, if the speed of relative rotation of the two shafts exceeds such tolerance, and if it is of such a sense that the secondary shaft 20—1 is rotating in a clockwise direction relative to the master shaft 20M, the brush 42 of the secondary commutator will move into contact with the commutator bar which is connected to the wire 51 prior to the expiration of the release period of the master relay coil 61, and hence the circuit to the secondary relay coil 72 will be energized. This establishes a circuit through the contacts 90—93 and the wire 117 to that winding of the motor 27 which will operate the speed governing means 26 to reduce the speed of the engine 22.

In accordance with the present invention, the amount or extent of the corrective adjustment is varied and controlled in various ways so as to attain unusual accuracy of correlation and unusual stability and the minimum fluctuation in the speed relationship of the two shafts. Thus, as one factor in attaining such controlled extent of the corrective adjustment, it will be clear that the length of the unexpired portion of the delay period of the master relay coil 61 at the time when the secondary relay coil, as 72, is energized constitutes a variable quantity which is in a general way a measure of the amount of corrective adjustment which is needed to re-establish the desired speed relationship. It has been pointed out, however, in the preceding discussion that in attaining speed correlation within a relatively small tolerance, in the order of one revolution per minute, the mechanism must be able to detect extremely small speed differences, and this requires that the release period of the master relay 61 be quite extended in most instances. Thus, under many circumstances the extended release period would tend to so extend the operative period of the adjusting motor 27 as to cause over-correction of the speed of the secondary shaft. Under the present invention, however, means are provided which enable a release period of the desired length to be employed for the master relay coil 61 without danger of objectionable over-correction. In the embodiment of the invention shown in Fig. 1 such means include the coil 62 of the balanced relay 60, and this coil 62 utilized as means for reducing the release time of the relay coil 61 whenever a control operation of the speed adjusting motor 27 is instituted. Thus, a normally long release period in the order of three or four seconds may be employed for the master relay coil 61, thereby to enable extremely small speed differences to be detected, and yet, this may be accomplished without causing an undue amount of corrective adjustment to be applied to the secondary shaft. Where the relay coil 62 is employed as a part of the means for accomplishing this result, circuits are provided for the relay coil 62 which are closed whenever one of the secondary relay coils 71 or 72 is operative to close the related relay contacts. Thus the relay contact 81 is connected by a wire 120 to ground at 111, and a wire 121 is extended from the relay contact 84 to one terminal of the relay coil 62. A wire 122 from the other terminal of the relay coil 62 is connected to the wire 98, thereby to extend circuit through the battery 99 and back to ground at 100. Hence when the relay coil 71 causes the contacts 81—84 to be closed, the relay 62 is energized. Similarly, the contact 91 is connected to ground at 114 by a wire 123, and the relay contact 94 is connected to the wire 121 by a wire 124, so that upon closure of the relay contacts 91—94, the relay coil 62 will also be energized.

When the relay coil 62 is thus energized, it attracts the right hand end of the armature 63 with a force which opposes the action of the coil 61 and augments the resilient forces which tend constantly to restore the armature to its neutral position, and hence as the energy of the condenser 101 is gradually dissipated through the coil 61, the combined action of the coil 62 and the resilient return forces acting on the armature 63 will restore the armature to its normal position more quickly than if the coil 62 were not energized. The effectiveness of the coil 62 in reducing the release time of the coil 61 is of course dependent upon the intensity with which coil 62 is energized. This intensity may be governed and matched with the characteristics of the relay coil 61 by means such as a resistance 125 included in the wire 122 so as to limit and reduce the current flow in the relay coil 62.

In accordance with the present invention the effectiveness of the relay coil 62 in reducing the release time of the master relay coil 61 is also governed differently in accordance with the direction of the corrective adjustment which is to be made, for by so doing, the effectiveness of the speed adjustments in different directions may be correlated despite the fact that the load on the secondary shaft tends to accelerate the corrective action when the speed of the secondary shaft is being reduced, and tends to retard the corrective action when the speed of the secondary shaft is being increased. Thus, the wire 124 includes another resistor 126, while the wire 121 includes resistance afforded for illustrative purposes by two resistors 127 and 128 in series, and the total resistive value of the resistors 127 and 128 is materially greater than the value of the resistor 126. Such resistors 127 and 128 therefore serve to reduce the current flow to the relay coil 62, below the value of the current which may flow through the circuit which includes the resistor 126, and hence when the corrective speed adjustment is to increase the speed of the secondary shaft, the relay coil 62 will be less effective and the period of corrective speed adjustment is greater than when the speed adjustment is to reduce the speed of the secondary shaft. In attaining such different reduction of the release period of the relay coil 61 in accordance with the direction in which the corrective adjustment is being made, a common resistance 125 has been shown in Fig. 1, resistances of different values have been shown in the branch leads to the relay contacts 84 and 94, but it will be recognized that in many instances the common resistance 125 and the resistor 126 might be eliminated and the desired differential in the release period of the relay coil 61 might in such a case be attained solely by resistance, as 127 or 128, in the circuit to the relay contact 84.

It will be observed that each of the relay coils 71 and 72 is illustrated as having an individual condenser 129 connected across its terminals, and in many instances such condensers may be of relatively small value or capacity so as to act merely to facilitate operation of such coils on current of a pulsating character. However, in most instances the condensers 129 are made of such a value as to impart a very slight slow-to-release period to the relay coils 71 and 72, for by so doing, the control apparatus may be caused to impart a relatively small corrective speed adjustment to the secondary shaft even though the detected speed difference is so slight that the energization of the coil 71 or 72 take place at substantially the end of the normal release period of the master relay coil 61.

In Fig. 2 of the drawings the invention is illustrated as embodied in a control unit CU1A which under some conditions may be advantageously substituted for each of the control units illustrated in Fig. 1 so as to attain accurate correlation of the secondary shafts with the master shaft. The control unit CU1A is in many respects similar to the control unit CU1, but the control unit CU1A includes an additional balanced relay 130 which is associated with and controlled by the other two balanced relays. Those elements of the control unit CU1A which corresponds in form and function to elements included in the control unit CU1 have been identified by corresponding reference numerals with the suffix "A" added in each instance. Thus the control unit CU1A includes a balanced relay 60A having actuating coils 61A and 62A arranged to operate upon opposite ends of a balanced armature 63A. One terminal of the relay coil 61A is connected to the wire 45 which may extend from one of the secondary commutator switches, as S1, and the circuit from the other terminal of the relay coil 61A is extended to the relay contact 85A by a wire 96A. It will be observed that the balanced relay 70A has fewer contacts than the balanced relay 70, for the contacts 81, 84, 91 and 94 are not included in the relay 70A, the functions of such omitted contacts being transferred in the present instance to the balanced relay 130. It will be observed that while the battery 99A is differently positioned in Fig. 2 than the corresponding battery 99 in Fig. 1, the connections to the relays 60A and 70A are in fact the same in Fig. 2.

The wires 46 and 47 shown in Fig. 2 may be extended from a secondary commutator switch in the manner illustrated in Fig. 1 and these wires are connected to the relay coils 71A and 72A in the same manner as in Fig. 1. Thus, when circuit is extended to the wire 45 by the commutator devices, the relay coil 61A is energized and the relay contacts 65A—69A are closed. The relay coil 61A, has the resistance 102A and the condenser 101A connected across its terminals and therefore has slow-to-release characteristics, and hence the relay coil 61A remains effective after the energizing circuit thereto has been broken. In the event that the rate of relative rotation of the master and secondary shafts is sufficiently great, the circuit to the wire 46, or to the wire 47, will be completed prior to the expiration of the release period of the relay coil 61A, and the related secondary coil, as the coil 71A, will therefore be energized. In such an instance the right-hand end of the armature 73A would be elevated, thereby to establish a holding circuit for the relay coil 71A through contacts 75A—82A. This holding circuit includes the contacts 65A—69A so that the holding circuit will be broken when the armature 63A returns to its neutral position. Such actuation of the armature 73A also serves to separate the contact 80A from the contact 85A, thereby to break the circuit to the master relay 61A and make it impossible to again energize this relay coil until the armature 73A has returned to its neutral position.

When the relay contact 80A is thus elevated it is engaged with the contact 83A, thereby to extend circuit through a wire 135 to one terminal of the actuating coil 131 of the balanced relay 130. When the other one of the coils of the relay 70A is energized, the left-hand end of the armature 73A is elevated, and a holding circuit is established through the contacts 76A and 92A. At the same time the separation of the contact 90A from the contact 95A breaks the energizing circuit of the master relay coil 61A. The relay contact 90A is at this time engaged with the contact 93A which is connected by a wire 136 to one terminal of the actuating coil 132 of the balanced relay 130. The other terminals of the relay coils 131 and 132 are grounded at 134, and thus the operation of the balanced relay 70A in the control unit CU1A serves to govern the operation of the balanced relay 130, and this relay is, in turn, arranged to control the energizing circuit to a related adjusting unit, as 35—1 shown in Fig. 1. In accomplishing this result, the balanced relay 130 has a movable contact 137 arranged when the actuating coil 131 is energized to engage a stationary relay contact 138, and the relay contact 138 is connected to the wire 117 which extends to the related speed adjusting unit in the manner disclosed in Fig. 1. Similarly the balanced relay 130 has a movable contact 139 arranged to be actuated upwardly when the coil 132 is energized, and in such upward movement the contact 139 is engaged with a contact 140 which is connected with the control wire 115 in the manner disclosed in Fig. 1. Thus, as a result of the operation of the relay 70A, the actuating coils of the balanced relay 130 are selectively energized so as to cause circuit closure to the speed adjusting unit in the proper manner.

It will be recalled in the embodiment of the control unit shown in Fig. 1 of the drawings, the master relay coil was arranged to have a normal release time of considerable magnitude, thereby to impart initial sensitivity to the control apparatus, and provision was made for reduction of the release period of the master relay coil as an incident to the initiation of a control operation. Provision is also made in the control unit of Fig. 2 for the attainment of such operation, and for this purpose the balanced relay 130 has a movable relay contact 141 which is actuated, when the coil 131 thereof is energized so as to engage a stationary relay contact 142. On the other side of the relay 130 a stationary contact 143 is provided which is engaged with a contact 144 when the coil 132 of the relay 130 is energized. The two control switches which are thus afforded in the relay 130 are utilized to control and reduce the release time of the master relay 61A when the relay 130 is actuated. Thus a wire 145 is extended from the contact 142, and a wire 146 is extended from the contact 144 and these wires are joined at a terminal 147 from which a wire 148 is extended to one terminal of the relay coil 62A. A wire 149 extends from the other terminal of the relay coil 62A to ground at 150. Thus a circuit from ground at 150 and through the relay coil 62A has two branches to the two relay contacts 142 and 144, and this circuit may be completed selectively through the contacts 142 and 144 so as to extend circuit to and through the battery 99A and back to ground at 100A. For this purpose a wire 151 is extended from the contact 141, and a wire 152 is extended from the contact 143, these two wires being joined at a terminal 153 from which a wire 154 is extended to the ungrounded side of the battery 99A.

It will be recalled that the effectiveness of the relay coil 62A in reducing the release time of the relay coil 61A is governed by the amount of current which flows through the coil 62A when this coil is energized. Thus resistors 155 and 156 are included in the wires 145 and 146, respectively, to control current flow through the relay coil 62A. In order that the release time of the master relay 61A may be reduced in different amounts in accordance with the direction in which the corrective adjustment is being made. The resistance 155 is made somewhat larger than resistance 156, and hence when the relay coil 131 is energized so as to cause the speed adjusting apparatus to increase the speed of the secondary shaft, the circuit to the relay coil 62A will be through the contact 142 and the resistance 155 so that the coil 62A will be less effective to reduce the release time than if the circuit were through the relay contact 144 and the smaller resistance 156. Thus the operating period of the speed adjusting mechanism will be longer when the speed is being increased than it is when the speed of the secondary shaft is being reduced. In this connection it will be observed that the resistance 125 and the resistance 156 may in some instances be unnecessary, and the desired difference in the period of operation may be attained solely through the use of the resistance 155 in the wire 145.

The use of the balanced relay 130 in the control unit CU1A is advantageous in that it enables relatively large amounts of current to be drawn through the contacts 138 and 140 independently of the contacts of the balanced relay 70A, and hence the responsiveness of the relay 70A is maintained at a high level at all times. The use of the balanced relay 130 also enables other advantageous improvements to be attained in the operation of the control unit, for the relay coils 131 and 132 may have condensers 160 connected across their terminals so as to impart slow-to-release characteristics to these relay coils. Through the use of this arrangement the period of operation of the speed adjusting means may be extended to some extent beyond periods of closure of the contacts of relay 70A, and hence when the speed differential between the master and secondary shafts is relatively high, the extended operative periods of the relay coils 131 and 132 will bridge the gap between the operations of the relay 70A. This produces substantially continuous operation of the speed adjusting means when the speed differential is relatively high, thereby to restore the desired speed relationship quite rapidly. Such operation of the control unit CU1A is, however, attained in such a manner that the sensitivity of the control unit to relatively small speed differences is not objectionably changed or reduced. Thus it will be clear that where the slow-to-release characteristics of the coils of the relay 130 extend the operating periods of the speed adjusting means beyond the period of closure of the contacts of the relay 70A, the relay 70A and the master relay coil 61A will then be free and in proper condition to detect reversal of the direction of relative rotation of the two shafts. In the event that such reversal takes place, the master relay coil 61A will again be operated and the proper one of the relay coils of the relay 70A will also be operated. This will of course establish an energizing circuit to one of the actuating coils of the relay 130 which will tend to return the armature 133 to its neutral position. Hence the newly energized relay coil of the relay 130 will act to reduce the release time of the previously actuated one of these coils, and under most circumstances will operate the armature through its neutral position and into its other active position to thereby institute a speed adjusting operation in the opposite direction.

In Fig. 3 of the drawings a control unit CU1B is illustrated wherein the reduction in the normal release time of the master relay is attained through the use of a more conventional type of relay means. Thus the control unit CU1B has three relays 160, 161 and 162 arranged for association with a detecting means such as the commutator switch devices of Fig. 1, and adapted to control speed adjusting means in the same manner as the control unit CU1 of Fig. 1. The relay 160 has but one movable contact 163 which is arranged in a normally spaced relation to a stationary relay contact 164. The relay 161 has four movable contacts 165, 166, 167 and 168, and when the relay 161 is de-energized, the relay contact 165 is engaged with a stationary contact 169, the relay contact 166 is opposed to but separated from a stationary contact 170, the relay contact 167 is engaged with a stationary contact 171 and is in a position to be separated from the stationary contact 171 and engaged with a contact 172 when the relay 161 is energized, while the relay contact 168 is disposed in spaced but opposed relation to a stationary relay contact 173 when the relay 161 is energized.

The relay 162 has contacts of the same character and arrangement as the relay 161, there being four movable contacts 175, 176, 177 and 178. The relay contact 175 is arranged to normally engage a stationary relay contact 179, while the contact 176 is normally spaced from a stationary relay contact 180 so as to be engageable therewith when the relay 162 is energized. The contact 177 is disposed between stationary relay contacts 181 and 182 so as to normally engage the contact 181, while the relay contact 178 is disposed in normally spaced relation to a contact 183 so as to be engageable therewith when the relay 162 is energized.

In associating the control unit CU1B with a detecting means such as the commutator switches shown in Fig. 1, the wire 45 is connected to one terminal of the relay 160 which constitutes the master relay of the control unit CU1B, and circuit is extended from the other terminal of the relay 160 by a wire 185 to the relay contact 181 of the relay 162. This relay contact is at this time engaged with the contact 177 which is connected by a wire 186 to the contact 171 of the relay 161, so that circuit is thereby extended to the contact 167. A wire 187 connects the contact 167 to one side of an energy source such as a battery 188, and the other side of the battery 188, is grounded at 189 to thereby complete an energizing circuit for the master relay 160. The relay 160 has the desired slow-to-release characteristics imparted thereto by means such as a condenser 191 connected in parallel across the terminals of the relay, a resistance 190 being connected in parallel with the condenser 191, and hence the relay contacts 163—164 are maintained closed for a predetermined normal release period after the opening of the energizing circuit of the relay 160.

The energizing circuits for the relays 161 and 162 are arranged to include the contacts 163—164, thereby to render operation of such secondary relays dependent upon operation of the master relay 160. Thus a battery 195 has one terminal grounded as at 196 while the other terminal thereof is connected by a wire 197 to the relay contact 163, and the contact 164 has a wire 198 extended therefrom to a terminal 199. Branch lead wires 200 and 201 are extended from the terminal 199 to corresponding terminals of the relays 161 and 162 respectively. The other terminal of the relay 161 is connected by a wire 202 to the relay contact 175 of the relay 162, which normally engages the contact 179 to which the wire 46 is connected, so that when the detecting means, such as the commutator switches of Fig. 1, extends circuit from ground and through the wire 46 during the operating period of the master relay 160, the relay 161 is energized. When this occurs, a holding circuit for the relay 161 is established, the contact 170 being grounded at 203, and the contact 166 being connected to the wire 202 by a wire 204. This holding circuit extends from ground 203 through engaged contacts 170 and 166, the wires 204 and 202, the relay coil 161, wires 200 and 198, the contacts 164—163 and through the battery 195 to ground. Similar circuits are provided for energizing the relay 162, the wire 47 being connected to the contact 165 so as to extend circuit to contact 169 and thence through a wire 205 to the other side of the relay coil 162. The desired holding circuit is in this instance afforded by grounding the contact 180 at 206 and connecting the contact 176 to the wire 205 by a wire 207.

Thus, in the control unit CU1B the secondary relays 161 and 162 cannot be energized unless the circuit to a respective one of these two relays is completed through the wire 46 or the wire 47 at a time when the relay contacts 163—164 are closed, and when one of the relays 161 or 162 has been thus energized it not only completes its own holding circuit through the contact 166 or 176, but also, through opening of the contact 165 or 175, breaks the energizing circuit to the other one of the secondary relays so as to prevent operation of the other secondary relays during the time when the previously energized secondary relay remains operative. The master relay 160 is, of course, normally operated at least once in each relative rotation of the compared shafts, and if such relative rotation exceeds the allowable rate or tolerance, the circuit to one of the secondary relays will be completed prior to the expiration of the release period of the master relay. Thus, in accordance with the sense of the detected variance, the relay 161 or 162 will be operated, and when the relay 161 is operated the circuit from the battery 188 will be extended to the relay contact 172 which is connected to the wire 115 of a speed adjusting unit such as the unit 35—1 of Fig. 1. Similarly the relay contact 182 is connected to the wire 117 of the speed adjusting unit, so that when the relay 162 is energized, the speed adjusting unit will operate in the other direction.

In the control unit CU1B, as in the control unit CU1, the normal release time of the master relay may be made relatively long, thereby to attain high sensitivity to small differences of speed, and means is provided for reducing this normal release time of the master relay as an incident to the initiation of a control operation. In attaining this end wire 210 is extended from one terminal of the relay 160 to a terminal 211 from which branch leads 212 and 213 extend to the contacts 173 and 183 respectively. A wire 214 is extended from the other terminal of the relay 160 to a terminal 215, and a wire 216 which includes a resistor 217 is extended from this terminal to the relay contact 178. A resistor 218 is connected between the terminal 215 and the relay contact 168, and hence when the secondary relay 161 is operated an alternative or shunt circuit, the effectiveness of which is controlled by the resistor 218, will be connected across the condenser 191 to thereby reduce the release time of the master relay 160. A conductor 216 leads from the terminal 215 to one end of a resistor 217, the other end of this resistor being connected to relay contact 178. Hence when relay 162 is energized an alternative or shunt circuit is connected across the condenser 191 and in this instance the effectiveness of this shunt circuit is controlled by the resistor 217. As in the case of the control unit CU1, it will be evident that in some instances it may be desirable to reduce the release time of the master relay in different amounts in accordance with the direction in which the corrective adjustment is to be made, and hence the resistance 218, which becomes effective when the speed of the secondary shaft is being reduced, is made somewhat smaller than the resistance 217, thereby to cause the release time of the master relay 160 to be reduced in greater amount when the speed of the secondary shaft is being reduced than when such speed is being increased. This result will be realized since the resistance 218, being smaller than the resistance 217, will enable the charge in the condenser 191 to be dissipated more rapidly than such charge will be dissipated when the resistance 217 is included in the shunt circuit about the condenser 191. Thus, while attaining great sensitivity to small speed differences, the control unit CU1B is operable to apply corrective adjustment to the secondary shaft without objectionable over-correction, and hence the relative speed of the compared shafts may be maintained within an extremely small tolerance through the use of the control unit CU1B.

In Fig. 4 of the drawings the invention has been illustrated as embodied in a control unit CU1C which is adapted to be used in a control apparatus such as that shown in Fig. 1, and in this control unit the master relay and the secondary relays are of the form utilized in the control unit CU1B and these relays are associated with a balanced relay 130C so that the control unit CU1C attains the same desirable operating characteristics as the control unit CU1A. Thus in the control unit CU1C master and secondary relays correspond in most respects to the relays of the control unit CU1B, and hence the same reference characters are employed with the suffix "C" added in each instance. The relays 161C and 162C, however, have but three movable contacts, the contacts 168, 173, 178 and 183 having been eliminated, and the function of these relay contacts in reducing the release time of the master relay has been transferred to the balanced relay 130C. Moreover, the relay contact 182C is, in this embodiment of the invention, connected by a wire 135C to one terminal of the relay coil 131C, so that when the relay 162C is operated, circuit is closed to the relay coil 131C so as to close the contacts 137C—138C and thereby extend circuit from the battery 195C to the speed adjusting unit through the wire 117. Similarly, the contact 172C is connected by a wire 136C to one terminal of the relay coil 132C, thus to cause the contacts 139C—140C to be closed when the relay 162C is operated. This closes a circuit to the speed adjusting unit through the wire 115. Thus the speed adjusting unit will operate in opposite directions in accordance with the manner in which the secondary relays 161C and 162C are operated. In this embodiment of the invention the two wires 210C and 214C from opposite terminals of the master relay 160C are extended to terminals 211C and 215C respectively, as in the embodiment of Fig. 3; and branch leads 212C and 213C are extended from the terminal 211C to the relay contacts 143C and 141C, respectively. A resistor 217C is connected, by means including a wire 216C, between the terminal 215C and the relay contact 142C, while a somewhat larger resistance 218C is connected between the terminal 215C and the relay contact 144C. Hence, when operation of the relay 130C in one direction or the other initiates operation of the speed adjusting means, a circuit through the resistance 217C or 218C is established which causes the release period of the master relay 160C to be reduced. The extent of such shortening of the release period of the master relay may be different in different directions of operation of the relay 130C, as by using different values for the resistors 217C and 218C.

The relay 130C in the control unit CU1C, as in control unit CU1A, may have a short sustained period of operation, as will be imparted thereto by condensers 160C of substantial capacity, and by such a sustained period of operation the speed adjusting operation, in some instances where the speed differential is high, may be continuous so as to correct the objectionable speed difference more quickly. Moreover, such an extended operating period for the relay 130C may be safely used because upon detection of reversal of the sense of rotation of the compared shafts, the other relay coil of the relay 130C is energized so as to cause prompt reversal of the relay 130C and prompt initiation of the desired speed correction in the opposite direction.

As hereinbefore pointed out, it is usually desirable, when the detected variance from the desired speed relationship between two shafts is unusually large, to re-establish the desired relationship as rapidly as possible, and in other embodiments of the invention, as for example, in those embodiments shown in Figs. 2 and 4, the speed adjusting mechanism is operated continuously when the speed differential is large, thereby to reduce the time necessary to re-establish the desired speed relationship. Under circumstances where such mechanism does not operate sufficiently fast, the means illustrated in Fig. 5 may be employed, and it will be observed that this means is there illustrated in association with a control unit CU which may constitute a control unit constructed in the same manner as any one of the control units CU1, CU1A, CU1B or CU1C. Thus as shown in Fig. 5, the wires 115 and 117 are connected to the respective field windings of an actuating motor 27D which operates the controlled speed governing mechanism 26D, and the common terminal of such field windings is connected to ground at 116D through a resistor 220 which normally limits the voltage and current applied to the motor 27D to thereby normally govern the speed of the motor. A shunt circuit 221 including a normally open contact 222 is provided around the resistance 220 so that when the contact is closed, the resistance 220 will be shunted out of the motor circuit and the motor will therefore operate at a higher speed in accomplishing the desired speed adjusting operation. In accordance with this invention such closure of the contact 22 is automatically accomplished when the detected speed differential is large, and this is done by providing the contact 222 as a part of a relay 223 having similar actuating coils 224 and 225, either one of which will effect closure of the contact 222. Corresponding terminals of the relay coils 224 and 225 are grounded at 227, while the other terminals of the coils 24 and 225 are connected respectively by wires 228 and 229 to the wires 115 and 117. The relay coils 224 and 225 are of the slow-to-operate type, and are so arranged that when the control impulses passing through the wire 117 or 115 are relatively short, as would be the case in the event that the speed differential is relatively small, the relay 223 will not operate. When, however, the control impulses in the wire 115 or 117 become quite long, a condition which indicates a relatively high speed differential, the relay 223 operates and the contact 222 is closed so as to cause operation of the speed adjusting means at a higher speed. Thus, the speed adjustment will be accomplished more rapidly, and as the desired speed relationship is approached, the length of the control impulses in the wire 115 or the wire 117 will decrease and the relay 223 will release, thereby to cause the final speed adjustments to be made more slowly. Such operation of the control means of Fig. 5 thus insures prompt or rapid correction of larger speed differentials while enabling accurate correction of smaller speed differentials, and hence the performance characteristics of the control apparatus as a whole are improved.

In Fig. 6 of the drawings there is illustrated another mechanism adapted for association with any one of the control units of Figs. 1 to 4 to produce more rapid operation of the speed adjusting means when the detected speed differential is relatively great. As there shown, this mechanism is associated with a control unit CU which may be any one of the control units of Figs. 1 to 4, and the control wires 115 and 117 are extended from the control unit to the respective windings of a reversible actuating motor 27E which drives the controlled speed governing mechanism 26E in the same manner as hereinbefore described in connection with Fig. 1. The common lead from the motor windings is connected to ground at 116E so as to afford parallel electrical paths, one of which includes a resistance 220E and the other of which includes a normally closed switch contact 222E. The switch contact 222E forms part of a slow-to-release relay 230 having an actuating coil 231 grounded at one of its terminals at 232. In the present instance the desired slow-to-release characteristics are imparted to the relay 230 by a condenser 234 connected across the terminals of the coil 231, a resistance 233 being connected in parallel with the condenser 234. The other terminal of the coil 231 has a wire 235 extended therefrom, and this wire is connected to the energizing circuit of the master relay in such a manner that the circuit to the relay coil 231 is broken when one of the secondary relays is operated. Thus, as to the embodiment of Fig. 1, the wire 235 is connected to the wire 96 so that when one of the secondary relays is operated, the opening of the relay contact 85 or 95 will break the circuit to the relay coil 231. With this arrangement the relay coil 231 will be continuously energized so long as the speed relationship of the two compared shafts is within the desired range, so as to maintain the switch contact 222E in an open relation. Hence when one of the secondary relays of the control unit operates so as to complete a control or energizing circuit to the motor 27E, the current flow through the motor will be governed by the resistance 220E so as to cause operation of the motor at slow speed. If the control or adjusting operation of the motor is relatively short, which of course indicates that the amount of variance of the relative speeds of the shafts is small, the relay coil 231 will remain energized throughout the entire adjustment period. When, however, the period of control or adjustment is relatively long, relay 230 will release so as to close the contact 222E and thus cause the motor 27E to operate at higher speed for the remainder of the control period. In attaining such action the release period of the relay 230 is, of course, set at a value which is related to the release time of the master relay of the control unit, such value being substantially less than the maximum release time which the master relay may have during a control operation. Thus, when the control operation of the motor 27E continues after release of the master relay of the control unit, that portion of the operating period of the motor 27E will be at high speed. This desirable operation arises because of the large variance in the relative speed of the two compared shafts, and the operation under such circumstances is further improved by providing a resistance 236 in series with the condenser 234. This resistance restricts the rate at which the condenser 234 may be charged, and hence when the detected speed differential is high, and the time between control impulses to the motor 27E is short, the condenser 234 will be charged in a correspondingly less amount. Hence the release time of the relay 230 will be reduced under such circumstances and the adjusting motor 27E will be operated at high speed for a correspondingly larger proportion of the control period. Thus the corrective action of the motor 27E is more rapid and effective when the speed differential is high, and yet, when the speed differential has been reduced to substantially the desired relationship, the adjusting motor operates at its low speed so as to reduce the possibilities of overcorrection.

As a further aid in attaining rapid correction of unusually large variations in the differential speed of the two compared shafts, the relay 230 may be constructed so as to possess slight slow-to-operate characteristics, for by this means the opening of the contact 222E may be so delayed that when the energizing periods for the relay are relatively short, as when such a high speed differential exists, the contact 222E will remain closed, and the entire period of adjusting operation of the motor 27E will therefore be at high speed.

It has been mentioned hereinbefore that load conditions on a secondary shaft may render the driving means of such shaft more quickly responsive to reduction of speed than to increase of speed, and while compensation for such difference in responsiveness may in many instances be attained in the manner taught in connection with the embodiments shown in Figs. 1 to 4, the difference in such responsiveness may in some instances require an even more pronounced difference in the speed adjustments applied to the shaft driving means in opposite directions. Thus the adjusting motor, as 27 may be connected or arranged so as to operate faster in one direction than in the other, and in Fig. 7 of the drawings an embodiment of the invention is illustrated wherein such operation is attained. As shown in Fig. 7, the adjusting motor 27F has the common terminal of its field windings grounded at 116F, while the other terminals of the two windings are connected by wires 115F and 117F to speed controlling mechanism 240 which operatively associates the wires 115F and 117F with the wires 115 and 117 respectively of a control unit CU which may be of the kind shown in any one of Figs. 1 to 4. The speed controlling mechanism 240 includes a relay 230F constructed and arranged in the same manner as the relay 230 of Fig. 6, but it will be observed that the relay 230F has two movable relay contacts 241 and 242 which are connected respectively to the wires 115 and 117. The contact 241 is arranged to operate between spaced contacts 243 and 244 which are connected in parallel to the wire 115F by resistances 245 and 246, while the contact 242 is arranged to operate between spaced contacts 248 and 249 which are connected in parallel to the wire 117F by resistances 250 and 251. The contact arrangement is such that when the relay coil 231F is energized, the contact 242 is engaged with the contact 248 and the contact 241 is engaged with the contact 244, and when the relay coil 231F is de-energized the contacts 241 and 242 are engaged respectively with the contacts 243 and 249.

It will be recalled that when the speed of the secondary shaft is to be increased, the circuit to the speed adjusting motor, as 27F, is completed through the wire 117, and hence the resistance 250 is made somewhat smaller than the resistance 245, thereby to cause the adjusting motor to operate faster when circuit is extended from the wire 117 than it does when circuit is extended from the wire 115. Similarly, the resistance 251 is somewhat smaller than the resistance 246, and in addition, the relationship among the resistances 245, 246, 250 and 251 is such that the resistance 250 is larger than the resistance 251 and the resistance 245 is larger than the resistance 246. Thus, when the relay 230F is fully energized, as it is when the speed differential is relatively small, the wires 115 and 117 will be connected to the motor 27F through the low speed resistances 245 and 250, respectively, and the motor 27F will operate at its lower speed in one direction or the other, as determined by the one of the wires 115 or 117 which is energized. If the motor 27F is energized for a period which extends beyond the time when the relay 230F is released, the engagement of the contacts 241 and 242 with the contacts 243 and 249 will throw the other resistances 246 and 251 into association with the wires 115 and 117 and the speed adjusting operation which is in progress will be completed at a higher speed as determined by the resistance 246 or 251 which is disposed in the energizing circuit of the motor 27F. In this connection it may be observed that the contacts of the relay 230F are of the make-before-break type so that operation of the motor 27F is not interrupted when a change is made from low to high speed operation. The operational advantages hereinbefore described with relation to Fig. 6 are attained in the embodiment of Fig. 7 since the relay 230F is similarly constructed and arranged, and in addition it will be observed that in the form shown in Fig. 7, the speed of corrective adjustment is not only varied in accordance with the magnitude of the speed variance which is to be corrected, but is also varied in accordance with the sense of the correction which is to be made.

In Fig. 8 of the drawings there is illustrated a part of the mechanism which is utilized in the control apparatus of this invention. Many of the elements included in the apparatus of Fig. 8 correspond in a general way with the elements shown in Fig. 1 of the drawings and therefore the same reference numerals have been used with the suffix "G" in each instance. Thus the variable speed driving engine 22G is adapted to have the speed thereof varied by adjustment of the valve 26G of the fuel supply means such as a carburetor, and such adjustment may be made either manually or under control of the adjusting motor 27G. The adjusting motor 27G is controlled by means which includes the commutator switch S1G which may correspond to the secondary commutator switch S1 of Fig. 1. The switch S1G is driven from a shaft 255 which may be the main shaft of the engine or a timing shaft thereof, and the shaft 255 is associated with the switch S1G by means of suitable gearing 25G and a flexible drive 256.

The switch S1G, in association with a master commutator switch and a control unit such as the control unit CU1, is arranged to govern the operation of the speed adjusting motor 27G, and this motor is associated with the valve 26G through means which includes the manual mechanism for adjusting this valve. Thus, as herein shown, the valve 26G has an operating arm 257 extended therefrom and the arm 257 is associated with an operating cable 258 in such a manner that the relationship of the arm 257 to the cable 258 may be varied. To this end a bracket 259 is fixed to the arm 257, and one arm 260 of a bell crank 261 is pivotally connected to the bracket 259. The bell crank 261 is also pivoted at 262 on the end of the cable 258 so that by rocking movement of the bell crank 261 the arm 257 may be rocked while the adjusting cable 258 remains in a particular adjusted relation. The cable 258 is enclosed within a rigid sleeve 264 adjacent to its forward end, and from the rear end of the sleeve 264 a flexible sheath 265 is extended so as to enclose the cable 258 as this cable is extended through the wall 266. Rearwardly of the wall 266 the cable 258 has an operating handle 267 whereby the cable may be actuated in either direction to impart manual adjustments to the valve 26G. Thus the cable 258 may be pushed in a right hand or forward direction to decrease the fuel supply, while similar actuation of the cable 258 in a left-hand direction serves to increase the fuel supply to the engine 22G, thereby to decrease or increase the speed of the engine 22G.

The desired automatic adjustment of the bell crank 261 with respect to the adjusting cable 258 is in present instance obtained through the medium of a Bowden cable connection 28G, one end of the cable being connected to an arm 270 of the bell crank 261 while the other end of the Bowden cable is connected to the operating arm 271 of the adjusting motor 27G. The sheath of the Bowden cable is anchored at one end by clamp 272 on a bracket 273 fixed at one end on the adjusting rod 258 and slidable as at 269 on the sleeve 264. The other end of the sheath is supported by a stationary bracket 274 mounted adjacent to the speed adjusting motor 27G. Thus when the motor 27G is operated in one direction, the arm 271 is rocked in a clockwise direction and this imparts movement to the bell crank 261 in a clockwise direction. Such adjustment of the bell crank 261 decreases the fuel supply to the motor or engine 22G and thus causes the speed of the engine 22G to be reduced. Similarly, when the motor 27G is operated in the other direction, the arm 271 is rocked in a counterclockwise direction so as to impart counterclockwise rocking movement to the bell crank 261, and this results in increasing the fuel supply so as to thereby increase the speed of the engine 22G.

The motor 27G may take many different forms, but it has been found that a motor known as type AYLC2034, made by Barber-Colman Company of Rockford, Illinois, is satisfactory for use in the present apparatus. The aforesaid motor includes an automatic brake which becomes operable when the energizing circuit to the motor is broken, the motor being of the reversing type.

The operating arm 271 is arranged to operate through a limited range, and limit switches are provided in the motor for stopping the operation when such limits of movement of the arm 271 have been reached. Such limit switches are illustrated diagrammatically in Fig. 8, and are identified as 276 and 277, such limit switches serving to interrupt the energizing circuits for the motor 27G. Additional switches 278 and 279 are also illustrated, these switches being normally open and being arranged to control signal devices which will indicate to the operator or pilot the fact that the automatic control apparatus has reached one limit or the other of its operative range. When such a signal is exhibited, the operator or pilot may adjust the manual means which includes the adjusting cable 258 and during such adjustment, the operation of the control apparatus of the present invention will again become active to continue the speed adjustment which was interrupted when the motor 27G reached one limit of its operative range.

In Fig. 9 of the drawings there is illustrated an embodiment of hydraulic actuator which may be associated with the two-way solenoid 30 illustrated in Fig. 1 of the drawings, and this hydraulic actuator is adapted to be associated with mechanism such as that shown in Fig. 8, in which instance a hydraulic motor 280 which forms a part of this hydraulic actuating mechanism would be substituted for motor 27G of Fig. 8. The two-way solenoid 30 has two operating coils which act in opposite directions upon an armature 281, and this armature is operatively connected to a balanced valve 282 which normally assumes a centered position within a valve casing 283. Hydraulic fluid under pressure is supplied to the valve casing through an inlet 284 and it is adapted to be passed from the valve casing 283 selectively through outlet passages 285 and 286. The outlet passage 285 is connected to the hydraulic motor 280 so as to operate the motor in one direction, while the outlet passage 286 is connected to motor 280 to operate the same in the other direction. The two passages 285 and 286 have valves 287 and 288 respectively positioned therein so that the rate of flow to the motor 280 through these passages may be regulated. Thus by adjustment of the valves 287 and 288 the speed of operation of the motor 280 may be varied, and by such means the adjustment of the speed varying means, such as the valve 26G of Fig. 8, may be attained at a faster rate when the speed of the engine is to be increased.

Figs. 10, 11 and 12 illustrate an embodiment of commutator switch designated generally as S5 which is particularly adapted to be used in the control apparatus shown in Fig. 1, the commutator switch S5 being illustrated as being particularly adapted for use in place of any of the commutators S1, S2, S3 or S$n$. It will be observed that in the commutator switches as S1, the commutator bars are arranged so as to be stationary while the brushes rotate in contact therewith, but in the embodiment shown in Figs. 10 to 12, the brushes are arranged to be stationary while the commutator bars rotate in contact therewith. Through the use of this arrangement it is possible to lengthen the life of the commutator device and also to reduce the weight thereof so that the control apparatus is better suited to aviation uses.

The commutator switch S5 comprises a two-part sectional housing wherein the main housing section 310 has its open end closed by a separable section 311, these two sections being held together by bolts 312. The main housing section 310 has a bearing bushing 313 extended from one end thereof, while the section 311 of the housing has an internal bearing recess 314 therein, and a rotor assembly 315 has the opposite ends of its central shaft 316 supported by ball bearings 317 and 318 disposed in the bearing recesses 313 and 314. The end of the shaft 316 which is supported in the bearing 317 has a non-circular end portion 319 extended beyond the bearing and into an externally threaded nipple so that the shaft may be connected to a flexible coupling or the like for the purpose of driving the rotor 315. Such a coupling may be of the general character shown in Fig. 8.

The rotor 315 includes a commutator section 320 and a slip ring section 321 which rotate as a unit, and the commutator section 320 comprises a plurality of circularly arranged commutator bars 322 which are disposed in insulated relation to each other so as to present a continuous outer circular surface. The slip ring section 321 is arranged to provide a plurality of slip rings, and in the present case six such slip rings are provided. These slip rings are identified respectively as 325—1, 325—2, 325—3, 325—4, 325—5 and 325—6, and are disposed in an insulated relation to each other. The switch S5, as herein shown, is particularly adapted for use where a 48 segment master switch such as the switch MS is to be used in association therewith so as to require active use of every fourth one of the commutator bars 322, and when such an arrangement is to be employed, the slip ring 325—1 is connected as by a strip 326—1 to two of the commutator bars 322 which are located in diametrically opposite positions. Similarly, the slip ring 325—2 is connected by means such as a strip 326—2 to two other commutator bars which are diametrically opposite to each other and are disposed so as to leave three unused commutator bars 322 between the commutator bars which are connected to the slip rings 325—1 and 325—2. Similar connections are provided, in order, from other slip rings.

Individual brushes are provided for contact with the respective slip rings 325, in the present instance such brushes are mounted in a brush supporting block 328 which is secured by means such as bolts 329 so as to extend along the slip ring section 321 at one side thereof. The brush mounting block 328 is made from insulating material, and has openings 330 which are disposed opposite the several slip rings 325 and radially with respect to the axis of the rotor 315. A brush 331—1 is disposed in one of these openings 330 so as to engage the slip ring 325—1, and a spring 332—1 which is held in place against the outer end of the brush 331—1 by a terminal plate 333—1 serves to urge the brush 331—1 against the face of the slip ring 325—1. Similar brushes are provided in the mounting block 328 for engagement with the other slip rings 325.

The commutator section 320 of the switch is arranged to be engaged by three brushes which are angularly spaced about the periphery of the commutator section in an angular relation which is substantially like that shown in respect to the brushes of the commutator S1 of Fig. 1. Thus, a brush 341 is arranged to engage the commutator substantially midway between a pair of similar brushes 342 and 343, and in a functional sense these three brushes correspond respectively to the brushes 41, 42 and 43 of the switch S1.

The brush 341 is supported in a mounting block 345 which is secured by screws 346' to the adjacent end of the mounting block 328, the brush 341 being disposed in a bore 346 in the block 345 and having a spring 347 held in place by a terminal bar 348 so as to press the brush 341 into contact with the surface of the commutator section 320. The brushes 342 and 343 are similarly supported to mounting blocks 350 and 351 which are generally similar in construction, and the mounting of the brushes 342 and 343 in these mounting blocks is substantially similar to the mounting of the brush 341 in the mounting block 345. It will be observed however that the mounting block 350 is associated with the adjacent edge of the mounting block 345 by a slidable joint 353 so that the brush 342 may be adjusted about the periphery of the commutator section 320 to thereby vary the angle between the points of contact of the brushes 341 and 342. Such adjustment is attained by an adjusting screw 355 which extends through the housing section 310 on an axis substantially parallel to the path of adjustment of the mounting block 350, the inner end of the adjusting screw 355 being provided with a head 356 which engages a T-slot 357 formed in the end of the mounting block 350. Thus, by operation of the adjusting screw 355, the mounting block 350 and the brush 342 may be adjusted, and the screw 355 is held in adjusted position by a lock-nut 358. It will be observed that the connections 356—357 between the adjusting screw and the mounting block 350 assure that a mounting block will be held against movement in either direction. The mounting block 351 has a similar slidable connection 353A with the mounting block 345, and a similar adjusting screw 355A is provided for adjusting the position of the block 351 and the brush 343 carried thereby.

The section 311 of the housing has a terminal block 360 mounted therein so as to be accessible at the outer end of a screw threaded nipple 361, and within the housing suitable wiring is extended from the terminal block 360 to the several brushes hereinbefore described. Thus, wires 362—1, 362—2, 362—3, 362—4, 362—5, and 362—6 are extended to the brushes 331—1, 331—2, 331—3, 331—4, 331—5, and 331—6 respectively. Similarly a wire 365 is extended from the terminal block 360 to the terminal 348 of the brush 341; a wire 366 is extended from the terminal block 360 to the brush 342; and a wire 367 is extended from the terminal block 360 to the brush 343. Thus the connections to the switch S5 may be readily established by insertion of a connector plug into the sockets or openings of the terminal block 360. In the use of the switch S5, the contact pressure exerted by the various brushes is substantially constant, in that such pressure is independent of the speed of rotation of the rotor 315. In addition, it will be observed that the switch S5 may be made so as to be of substantially less weight than a commutator switch wherein the brushes are rotated within a stationary ring of commutator bars.

In practice I prefer to utilize the switch S5 only in connection with the secondary shafts, while a commutator switch such as the switch MS is employed in association with the master shaft, and such an arrangement has been illustrated in Fig. 13 of the drawings. The arrangement shown in Fig. 13 is similar to that shown in Fig. 1 in that a master shaft 20M has a master commutator switch MS associated therewith and this master commutator switch has a brush 40 which is grounded at 56. Diametrically opposite commutator bars of the switch MS are electrically interconnected as by wires 55. In Fig. 13 I have illustrated four secondary shafts identified as 20—1, 20—2, 20—3 and 20n, and a commutator switch such as the commutator switch S5 has been diagrammatically illustrated in association with each of these shafts. Thus, in respect to the secondary shaft 20—1, a commutator switch S5—1 has been diagrammatically illustrated with the commutator thereof associated with the shaft 20—1 and the various wires included within the switch have been illustrated as being extended to the terminal block 360. The wires extended from the various brushes 331 are associated with one set of commutator bars of the master switch MS by means of a six wire cable 370—1, one wire being associated with each of the brushes 331 by electrical connection with the appropriate one of the wires 362 at the terminal block 360. The set of commutator bars which pertains to the switch S5—1 constitutes every fourth one of the commutator bars of the master switch MS, and since diametrically opposite ones of such commutator bars of the master switch are electrically interconnected, the six wires of the cable 370—1 are sufficient for this purpose.

The secondary shaft 20—2 has a commutator switch S5—2 associated therewith in a similar manner by a six wire cable 370—2 which interconnects the slip ring brushes of the switch S5—2 to the respective commutator bars of the next set of six commutator bars of the master switch MS. The secondary shaft 20—3 has a commutator switch S5—3 associated therewith, and the slip ring brushes of this commutator are similarly connected to the next set of six commutator bars of the master switch MS by a similar six wire cable 370—3. In a similar manner the secondary shaft 20n has a commutator switch S5n associated therewith, and the slip ring brushes of this commutator switch are connected by a six wire cable 370n and to the next or fourth set of six commutator bars of the master switch MS.

The wires from the three brushes 341, 342, 343 of each secondary commutator switch are diagrammatically illustrated in Fig. 13 as being extended to the terminal block 360 of the secondary switch to which they pertain, and thus, wires 45, 46 and 47 may be extended from the terminal block 360 of each switch to the control unit of the control apparatus with which the commutator switch is to be used, and it will be observed that such control unit may be of the character shown in Figs. 1, 2, 3 or 4.

Thus it will be clear that the commutator switch such as the switch S5 may be included in the control apparatus such as that shown in Fig. 1, and when so included the overall of weight of the control apparatus will be reduced and the operative life thereof will be extended because the brush wear will be minimized by the uniform brush pressure which is attained in this embodiment of the invention.

In Fig. 14 of the drawings there is illustrated an embodiment of the invention whereby one of the engines of a two motored airplane may serve as a master engine and the speed of the other engine may be correlated with the master engine within relatively close limits. In this embodiment of the invention a master commutator switch MS6 and a secondary commutator switch S6 are employed and these switches may be of an identical construction. The master switch MS6 is arranged so that the brush elements thereof are driven by a master shaft 20—6 while the brush elements of the secondary commutator switch S6 are driven by a secondary shaft 20—7, these shafts constituting driven elements of the master engine and the secondary respectively of the airplane. The secondary commutator switch has brushes 41—6, 42—6 and 43—6 which correspond to the brushes included in the secondary commutator, as S1, of Fig. 1. Similarly arranged brushes are included in the master switch MS—6, but since this switch is to act as the master, only one of these brushes is utilized and this brush is identified as 40—6 since it corresponds in function with the brush 40 of the embodiment of the invention shown in Fig. 1.

The commutator bars of the switches MS6 and S6 are so arranged that diametrically opposite commutator bars in each switch are electrically connected, and correspondingly located commutator bars of the two switches are electrically connected by wires indicated generally at 375, there being connector plugs 376 and 377 interposed in the connecting wires 375 to facilitate installation of the apparatus.

The two commutator switches are associated with a control unit CU6 which is in many respects similar to the control unit CU1B shown in Fig. 3 of the drawings, and through this control unit, the operation of an adjusting motor 27—6 is controlled so that a controlled governing mechanism such as the speed varying mechanism 26—6 may be operated in opposite directions. The speed governing mechanism 26—6 may be of the form illustrated in Fig. 8 of the drawings, and may be arranged to adjust the fuel supply and hence govern the speed of a variable speed engine which drives the secondary shaft 20—7. In the present instance the motor 27—6 is energized from a suitable source of current indicated at 378 and affording line wires 379 and 380, and these line wires are connected to the various elements of the apparatus through a control panel 381 which affords a manual control switch 382 through which the mechanism may be rendered operative or inoperative. The control panel 381 also includes signal lamps 383L and 382R which are lighted selectively, as will hereinafter be explained, to indicate that the adjusting motor 27—6 has reached the limit of its travel in one direction or the other.

One side of the circuit is extended from the line wire 380 to the brush 40—6 of the master switch by means including a wire 384, this wire being extended through the plug socket 376. This same side of the circuit is extended by wires 385 and 386 to the common terminal of the field windings 387 and 388 of the adjusting motor 27—6. The other side of the source 378 is extended from the wire 379 through the switch 382 and a wire 389 to a terminal 390 of the control unit CU6, this connection being through a connector plug 391 to facilitate installation of the apparatus. Circuit is extended from the line wire 380 through the wire 385 and a wire 392 to another terminal 393 in the control unit CU6, and as will be hereinafter explained in detail, the control circuits from the control unit CU6 to the field windings of the motor 27—6 are arranged to include terminals 394 and 395 which form part of the control unit CU6. Thus, wires 115—6 and 117—6 are extended from the terminals 394 and 395 through the connector plug 391 to the field windings 387 and 388 respectively, such wires being extended through a connector plug 396 at the motor 27—6. The wire 115—6 is connected to the field winding 387 through a limit switch 397 which, when opened by operation of the motor to one limit of its travel, is arranged to engage another contact which extends circuit through a wire 398 to the signal lamp 382R, and circuit from this lamp is continued to the line wire 380 by a wire 399. A similar limit switch 400 is interposed between the wire 117—6 and the field winding 388, and when this switch opens the circuit to the field winding, it is arranged to engage another contact which extends the circuit through a wire 401 to the signal lamp 383L. Thus when the motor reaches one limit of its travel, this condition is indicated by the lighting of the appropriate one of the two signal lamps, and the pilot may then readjust the manual control for the secondary motor in the manner hereinbefore described in connection with Fig. 8 of the drawings, thereby to enable the control apparatus to continue its automatic operation.

As hereinbefore pointed out, the switch S6 constitutes the secondary switch of the apparatus shown in Fig. 14, and wires 45, 46, and 47 are extended from the three brushes of this commutator switch in the same manner as in the embodiment of the invention shown in Fig. 1 of the drawings. These wires are extended through the connector plugs 377 and 391, and in the control unit CU6, the wire 45 is connected to a terminal 402, the wire 46 is connected to a terminal 403, and the wire 47 is connected to a terminal 404.

The control unit CU6, being similar to the control unit CU1B, has a master relay 160H and two secondary relays 161H and 162H, and these relays are connected and related to each other in substantially the same manner as the three relays of Fig. 3. Thus, in general, it should be observed that circuits extended from the line wire 380 through the switch MS6 and the switch S6 to the wires 45, 46 or 47, must be extended through the relay to be operated and back to the line wire 379 through the manual switch 382. As to the master relay 160H, such a circuit is extended from the terminal 402 through a protective resistor 405 and a wire 406 in series to one terminal of the coil of the master relay 160H, while means including a wire 214H connects the other side of the relay 160H through the relay contacts 171H and 181H, in series, and thence through a wire 407 to the terminal 390. The relay 160H has means including a condenser 191H connected across its terminals to impart predetermined slow-to-release characteristics thereto. The energizing circuit for the relay 161H is extended from the terminal 403 by a wire 408 to a normally closed relay contact 175H of the relay 162H, from which a wire 202H extends circuit to one side of the relay coil. Similarly, the energizing circuit for the relay 162H includes a wire 409 from the terminal 404 to the normally closed relay contact 165H, from which a wire 205H extends to one side of the relay 162H. Wires from the other two terminals of the relays 161H and 162H are connected to the relay contact 164H, while a wire 410 extends from the contact 163H to the wire 407 to thus carry the circuit back to the terminal 390. Holding circuits for the relays 161H and 162H are provided by a wire 411 and branch leads 412 and 413 to normally open contacts of the respective relays 161H and 162H, so that these holding circuits extend through and are controlled by the master relay contacts 163H and 164H. These holding circuits are effective, so long as the relay contacts 163H and 164H are closed, to hold the actuated one of the secondary relays in its actuated condition after the circuit through the wire 46 or 47 has been broken.

In the embodiment of the invention shown in Fig. 14, a relatively long normal release time for the master relay 160H is employed, such as two or three seconds, to thereby attain sensitivity of detection of undesired speed variation between the two shafts, and means are provided for reducing the normal release time of the master relay whenever one of the secondary relays is operated. This is accomplished by connecting electrical resistance across the terminals of the master relay coil. Thus, a wire 201H, connected to the wire 406, has branch leads extended to the stationary contacts of normally open relay contacts 168H and 178H, and these contacts 168H and 178H are connected through adjustable or variable resistances 218H and 217H, respectively, to a wire 414 which extends to the wire 214H. Thus when the relay 161H is energized, the contact 168H is closed and the resistance 218H is connected across the terminals of the master relay 160H, while operation of the relay 162H similarly connects the resistance 217H across the master relay.

When the relay 161H is thus energized, a contact 172H is closed, this contact being connected by a wire 415 to the terminal 394, and therefore circuit is extended from the contact 172H through the winding 387 of the adjusting motor 27—6 and to one side of the power source at 380. The movable relay contact which thus engages the contact 172H is connected by a wire 186H to the contact 181H and thence through the wire 407 to the terminal 390, thereby to complete circuit through the wire 389 and the switch 382 back to the other side of the line. The circuit for the other field winding of the motor 27—6 is completed by closure of the relay contact 182H when the relay 162H is energized, the relay contact 182H being connected to the terminal 395 by a wire 416 and the movable contact which engages the contact 182H being connected to the wire 407.

Thus, the operation of the adjusting motor 27—6 is initiated in the appropriate direction by selective closure of the secondary relays 161H or 162H, and operation of the motor is continued until release of the master relay 160H breaks the holding circuit to the effective one of the secondary relays. Such periods of operation of the motor are so controlled, however, by the resistance 217H or 218H that objectionable over-correction is avoided despite the relatively protracted normal release period of the master relay 160H. In the embodiment of the invention shown in Fig. 14, the provision for adjustability of the resistance 217H, as by an adjusting member 418, and for adjustment of the resistance 218H, as by an adjusting member 419, enables such control of the operation of the apparatus to be quickly and easily attained with respect to a particular installation. Thus the normal release period of the master relay 160H may be established at an arbitrary and relatively large value in order that sensitivity of detection may be assured, and after installation of the apparatus, the apparatus may be adjusted by the adjustable devices 418 and 419 so as to attain the desired correlation without over-correction or hunting. As an example, it may be found, upon initial operation of a newly installed control apparatus, that the length of the operating period of the adjusting motor and the speed at which the motor operates the governing mechanism will cause over-correction where the detected speed differential is slight, and when such operation is noted, corrective adjustment may be made upon the resistances 217H and 218H so as to decrease the amount of resistance which is thrown across the terminals of the master relay. Such reduction in the effectiveness of these resistances enables more rapid dissipation of the charge in the condenser 191H and this results in reducing or shortening the normal release time, and hence the apparatus may be readily set so as to attain the desired correlation without over-correction. It will be observed, of course, that the amount of resistance thus thrown across the terminals of the relay should be kept as large as is consistent with elimination of over-correction, for by so doing the time required to correct large speed differences will be minimized.

In Fig. 15 of the drawings there is illustrated another embodiment of the invention whereby correlation of the two engines of a two motored airplane may be attained in such a manner that one of the engines serves as a master with which the speed of the other or secondary engine is correlated. This embodiment of the invention is adapted particularly for use where the speed correlation and adjustment is attained through the use of variable pitch propellers, although in most of its aspects, this embodiment of the invention might be used with equal effectiveness for adjusting the fuel supply of the engines so as to control and correlate the engine speeds. Thus, the master engine has a master shaft 20—8 the speed of which may be adjusted by a propeller pitch varying means 420 associated with the propeller of the master engine and driven by a reversible motor 26—8 of the construction shown in Fig. 14. Similarly the secondary engine has a secondary shaft 20—9 which may be controlled and adjusted as to speed by a propeller pitch varying means 421 associated with the propeller of the secondary engine and driven by a motor 26—9 of the construction shown in Fig. 14.

The master shaft 20—8 and the secondary shaft 20—9 have commutator switches MS7 and S7 respectively associated therewith, such switches both being of the same construction as the switch S5 of Figs. 10 to 12, so that the commutators of these switches are driven by their respective shafts 20—8 and 20—9. In the secondary switch S7 the three brushes have been identified as 41—7, 42—7 and 43—7 so as to conform with the identification used in Fig. 14; and similarly the one brush of the master commutator switch MS7 which is utilized is identified as 40—7. The other two brushes of the master switch MS7 are left in position. The same condition of course applies to the embodiment of Fig. 14.

The commutator bars of the two switches MS7 and S7 are connected by means including wires 375K and connector plugs 376K and 377K in the general manner disclosed in Fig. 14, it being recalled however, that the connections within the switches MS7 and S7 include slip ring arrangements as shown in Figs. 10 to 12. Similarly, the three brushes of the secondary switch S7 are connected through the plug 377K and wires 45, 46 and 47 to a control unit CU6K of the construction shown in Fig. 14. This control unit has corresponding terminals, and the wires 45, 46 and 47 are connected through the plug 391K to the terminals 402K, 403K and 404K, respectively.

In the embodiment shown in Fig. 15 the circuit is energized from a power source such as a battery 378K which has one side thereof connected by wire 425 to the terminal 393K of the control unit CU6K. The other side of the battery 378K is associated with the mechanism through a switch panel 426 which includes a two-way switch 427 and a three-way switch 428. Thus the other side of the battery 378K has a wire 429 extended therefrom with branch leads to the common terminals of the two switches 427 and 428. The switch 427 has one stationary contact 430 connected by a wire 431 to the field winding 387K of the motor 26—8, while the other contact 432 of the switch 427 is connected by a wire 433 to the field winding 388K of the motor 26—8. A wire 434 is extended from the wire 425 and in series through wires 435 and 436 to the common terminal of the two field windings of the motor 26—8, and hence by manual closure of the switch 427 selectively to the contact 430 or the contact 432, the motor 26—8 may be operated in either direction selectively to produce the desired adjustment of the propeller of the master engine. This will, of course, vary the speed of the master engine and its shaft 20—8. The motor 26—8 has limit switches through which the wires 431 and 433 are connected in the same general manner as in the embodiment shown in Fig. 14, and when either of these limit switches is opened, a warning circuit is extended through a wire 438 to a signal lamp 439 which is connected at its other side to the wire 434.

Generally similar manually controlled connections are provided for the motor 26—9, there being a contact 440 in the switch 428 which is connected by a wire 441 to one side of one of the field windings of the motor 26—9 through its associated limit switch. The switch 428 also has a contact 442 which is connected by a wire 443 to one end of the other field winding of the motor 26—9 through the related limit switch, and the common terminal of the motor 26—9 is connected by a wire 444 to the wire 434. When either one of the limit switches of the motor 26—9 is opened, a circuit is closed through means including a wire 445 through a signal lamp 446 and back to the wire 434. Thus by closure of the switch 428 to one of the contacts 441 or 442, the adjusting motor 26—9 may be operated in either direction to adjust the pitch of the propeller of the secondary engine, thereby to cause the speed of the secondary engine to be varied.

When the control apparatus of the present invention is to be rendered operative, the switch 428 is closed to a contact 450 which is connected through a wire 451 to the terminal 390K of the control unit CU6K. When this is done the relays of the control unit are rendered operative, and circuit may be extended thereby to the terminal 394K or 395K selectively. When circuit is thus extended to one of these two control terminals, this embodiment of the invention is arranged to control circuit to the windings of the motor 26—9 selectively, and in accomplishing this result, a two-way or balanced relay 452 is utilized. This relay 452 has an actuating coil 453 which is operable to move the contact 454 of the relay into engagement with the contact 455 which is provided in the wire 443, and a similar coil 456 is provided in the relay 452 which is operable to draw the contact 454 into engagement with a contact 457 which is connected to the wire 441. The contact 454 of the relay 452 is connected by a wire 458 to the wire 429 so that when the contact 454 is engaged with one or the other of the contacts 455 and 457, circuit is completed to one or the other of the field windings of the motor 26—9. The relay coils 453 and 456 are controlled by the control unit CU6K, the terminal 394K of the control unit being connected by a wire 460 to one terminal of the relay coil 453, while the terminal 395K is connected by a wire 461 to one terminal of the relay coil 456. The other terminals of these two relay coils are connected by means including a wire 462 to the wire 425. Hence when circuit is extended to the terminal 394K, the relay coil 453 is energized so as to cause circuit through the contact 455 to one of the field windings of the motor 26—9, while completion of a circuit to the terminal 395K energizes the relay coil 456 and causes circuit to be completed through the contact 457 to the other field winding of the motor 26—9. Condensers 465 and 466 are connected across the terminals of the relay coils 453 and 456 to thereby impart slow-to-release characteristics thereto and obtain the resulting advantages described in connection with the relay 130 of Fig. 2. Thus the control mechanism of the Fig. 15 operates to adjust the speed of the secondary shaft 20—9 to conform with the speed of the master shaft 20—8. The speed of the master shaft 20—8 may of course be varied from time to time by manipulation of the manual control switch 426, and in such an event the control apparatus operates to adjust the speed of the secondary shaft 20—9 to conform with the newly established speed of the master shaft.

In Figs. 16 and 17 of the drawings I have illustrated a simplified form of commutator switch which may be utilized where it is possible to locate the master shaft in a relatively close relation to the secondary shaft which is to be coordinated therewith. Such a situation arises where the speed of a single engine such as the engine of a single motored airplane is to be controlled by a variable speed master shaft which may be driven by a variable speed electric motor. Thus as shown in Fig. 16 of the drawings a master shaft 20—4 which constitutes the shaft of a variable speed motor 470 is arranged to control the speed of a secondary shaft 471, and this is accomplished through a commutator switch 472 associated with a control unit CU which may be the type shown in Figs. 1, 2, 3, or 4. The secondary shaft 471 may constitute a shaft of a variable speed internal combustion engine 22—4 or may be a shaft driven thereby through means such as gearing 25—4. The speed of the engine 22—4 may be governed by a controlled governing mechanism 26—4 of the character hereinbefore described, particularly in respect to Fig. 1, of the drawings, and this controlled governing mechanism may be actuated through an adjusting movement in two directions by means such as a motor 27—4 or hydraulic means 29—4, Fig. 16A, as described in connection with Fig. 1. The actuating means such as the motor 24—4 may be controlled by wires 115 or 117 to operate the governing mechanism in opposite directions, such wires 115 and 117 being associated with the control unit CU in the manner hereinbefore described in connection with Fig. 1. The control unit CU is in turn associated with the commutator switch 472 in the manner substantially similar to the manner in which the secondary switches of Fig. 1 are associated with the control unit, as CU1, and control wires 45, 46 and 47 are extended from the commutator switch 472 in substantially the same manner.

The motor 470 which drives the master shaft 20—4 is arranged to be varied as to speed by a centrifugal speed governing mechanism 475 of conventional form, or the energizing circuit from a battery 476 to the field winding of the motor 470 may be arranged to include a rheostat 477 for accomplishing such variation in the speed of the motor 470, as shown in Fig. 16B.

The commutator switch 472 includes a rotatable disc 478 mounted and rotated by the master shaft 20—4, while a slip ring assembly or rotor 479 is mounted within a housing 480 with one end 481 thereof in a spaced but opposed relation to one face of the disc 478. The slip ring assembly 479 is supported on one end of the shaft 482 which is, in turn, supported by spaced bearings 483 carried in an extended bearing sleeve 484 of the housing 480, and this shaft 482 is coupled as at 485 to the secondary shaft 471 so as to be driven thereby. The disc 478 and the slip ring assembly 479 are arranged in coaxial relation, and cooperating means are provided on these two members whereby impulses to the wires 45, 46 and 47 are afforded at a speed or frequency which varies with the speed of relative rotation of the shafts 20—4 and 471 and in an order or sequence which varies in accordance with the sense of such relative rotation. The arrangement is such that the frequency and order of such impulses is similar to that attained through the use of the cooperating master and secondary commutator switches illustrated in Fig. 1. Thus it will be recalled that each control unit includes a battery such as the battery 99—4 which is grounded as at 100—4, and circuit is continued from ground at 490 through a wire 491 to a brush 492 of the commutator switch 472. The brush 492 is mounted in the housing 480 and is spring pressed into contact with the peripheral edge or surface of a slip ring 493 which is located on the slip ring assembly 479 so that one edge or surface thereof is exposed as a part of the surface 481 in opposed relation to the disc 478. Similar brushes 495, 496 and 497 are mounted in the housing 480 so as to bear respectively against slip rings 498, 499 and 500 of the slip ring assembly 479, it being understood that these three slip rings are insulated from each other and from the slip ring 493. The brush 495 is connected to the wire 45, the brush 496 is connected to the wire 46, and the brush 497 is connected to the wire 47, and means are provided within the commutator switch 472 for electrically interconnecting the brushes 495, 496 and 497 to the brush 492 in such a manner that impulses in the wires 45, 46 and 47 are afforded at a frequency which varies with the difference in speed between the master and secondary shafts and which vary as to sequence in accordance with the sense of such speed variation. To attain this result, a pair of spring pressed brushes 505 and 506 are arranged in the disc 478 so as to be forced in an endwise direction toward and into abutment with the end surface 481 of the slip ring assembly 479, and the brushes 505 and 506 are so located on the disc 478 that the brush 505 bears against the edge surface of the slip ring 493. Radially inwardly of the slip ring 493, a plurality of individual contact segments 511, 512 and 513, Fig. 17, are provided, these contact segments being insulated from each other and from the slip ring 493. As herein shown the adjacent ones of the segments are spaced from each other by segments 514 which may be of insulating material or may be made of metal insulated from the adjacent segments which are separated thereby. In the present instance two contact segments 511 are provided, and these two segments are disposed in diametrically opposite positions in the face 481 and are electrically connected to the slip ring 498. Similarly two contact segments 512 are provided in diametrically opposite locations and these two segments 512 are disposed so as to be spaced from the segments 511 in a clockwise direction as viewed in Fig. 17. Two contact segments 513 are also provided in diametrically opposed relation, such segments being arranged so as to be spaced from the segments 511 in a counterclockwise direction. The segments 512 are electrically connected to the slip ring 499, while the segments 513 are electrically connected to the slip ring 500, and these segments as well as the segments 511 are arranged to be engaged by the brush 506 in the course of relative rotation of the master and secondary shafts. The brushes 505 and 506 are electrically interconnected, and hence it will be clear that circuit will be extended from ground at 490 through the brush 492 the slip ring 493 and the brush 506 to the segments 511, 512 and 513 in a different order in accordance with the sense of relative rotation of the master and secondary shafts. Thus when the commutator 472 is associated with a control unit CU in the manner illustrated in Fig. 16, such control unit CU will operate to govern the speed of the secondary shaft and correlate same with the speed of the master shaft in the same manner as hereinbefore described with reference to the other embodiments of the invention.

It will be observed that in the embodiment of the invention shown in Figs. 1 to 4 of the drawings, the values of the resistances which control the reduction of the release time of the master relay have been shown as having fixed values, and in high production manufacture of the control apparatus for use with equipment of a particular design, such fixed values for such resistors serve to attain the desired functioning of the control apparatus so as to cause proper speed correlation. However, where varying conditions of use or possible variations in the operating characteristics of the equipment are possible or expected, these controlling resistances may be made variable or adjustable as taught in connection with the embodiments of the invention disclosed in Figs. 14 and 15. Such variable or adjustable characteristics may, of course, be utilized even though the resistances are to be of different values in respect to opposite directions of operation of the speed adjusting means. Thus in any event, whether these control resistances are of fixed value or are adjustable in character, their controlling action in governing the characteristics of the control impulses to the speed governing means enables the control apparatus to be used with any particular speed adjusting means without change or modification of the speed adjusting means.

In view of the foregoing description it will be apparent that the present invention enables control apparatus for correlating or controlling the speed of one or more shafts or the like to be readily adapted to the equipment with which it is to be used, and hence, without redesign or modification of such equipment, the control apparatus of this invention will function to attain the desired speed correlation or control. Moreover, it will be apparent that with the control apparatus of the present invention, the desired accuracy of speed correlation or control may be attained under the varying circumstances which involve variations in the nature or type of the associated equipment or where varying conditions are encountered in use. Furthermore, the ability of the present control apparatus to variably control and variably adjust the speed of one or more engines or the like is of particular utility in aviation uses, for through the functioning of the present apparatus the operation and control of an airplane is materially simplified whether the airplane be of the single motor type or the multimotor type. Thus, in a single motored airplane, the maintenance of the engine speed at a predetermined standard established independently of the load avoids the necessity for manual control and readjustment of engine speed during rapid changes of flight attitude which would otherwise tend to violently race the engine of the airplane. In airplanes having two or more engines the control apparatus has this same beneficial effect where an electric motor or the like is used as the speed standard; and in such airplanes, whether the speed standard is set by an independent electric motor or by one of the engines, the control apparatus serves to afford a single manual control for the plurality of engines, thereby to simplify the operation of the airplane. The maintenance of synchronism of the several engines of the airplane also has other beneficial results, for it reduces deviation from the desired course which might result from unbalanced application of driving power, and is helpful under conditions where formation of ice on one or more propellers would otherwise reduce engine speed or cause lack of synchronism of the engines.

It will also be evident that the control apparatus of the present invention is of such a character that many difficult and widely varying problems of synchronization or speed control may be handled thereby, for the present control apparatus not only is readily adaptable to the varying types of speed adjusting means which may be encountered but is also of such a character that it compensates for differences in the response of the controlled apparatus due to load or the like. Moreover, the speed adjustments attained with the present apparatus are directly related to the magnitude of the speed differential which is to be corrected, and this is accomplished despite the fact that the detecting means of the control apparatus is sensitive to extremely small speed variations.

The present apparatus is of such a character that the life of the apparatus may be extended and the weight thereof minimized through the use of switch means having stationary brushes and rotating commutators, and by provision for adjustment of the angle between two or more of the brushes which engage the commutator, the present invention enables the performance characteristics of the present apparatus to be more readily adapted to operating conditions encountered in use.

Thus, while I have illustrated and described the preferred embodiments of my invention, it is to be understood that these are capable of variation and modification and I therefore do not wish to be limited to the precise details set forth, but desire to avail myself of such changes and alterations as fall within the purview of the following claims.

I claim:

1. In a control apparatus, a master relay having means effective to impart slow-to-release characteristics thereto affording a normal release period of substantially predetermined length, a secondary relay, a control circuit having switch means therein arranged for closure by said secondary relay when said secondary relay is operated, relay contacts arranged for closure by said master relay and means connecting said relay contacts in a circuit for governing closure of said control circuit by said switch means, means affording a holding circuit for said secondary relay rendered effective by said secondary relay when said secondary relay is operated, said holding circuit having contacts governed by said master relay to release said secondary relay when said master relay releases, and means rendered operative by said secondary relay when said secondary relay is operated for reducing the release period of said master relay.

2. In a control apparatus, a master relay having means effective to impart slow-to-release characteristics thereto affording a normal release period of substantially predetermined length, a secondary relay, a control circuit having switch means therein arranged for closure by said secondary relay when said secondary relay is operated, relay contacts arranged for closure by said master relay and means connecting said relay contacts in a circuit for governing closure of said control circuit by said switch means, means affording a holding circuit for said secondary relay rendered effective by said secondary relay when said secondary relay is operated, said holding circuit having contacts governed by said master relay to release said secondary relay when said master relay releases, means rendered operative by said secondary relay when said secondary relay is operated for reducing the release period of said master relay, and means for adjusting the effectiveness of said last mentioned means to thereby enable the reduction of the release period of said master relay to be adjustably varied.

3. In a control apparatus, a master relay having means effective to impart slow-to-release characteristics thereto affording a normal release period of substantially predetermined length, a secondary relay, a control circuit having switch means therein arranged for closure by said secondary relay when said secondary relay is operated, relay contacts arranged for closure by said master relay and means connecting said relay contacts in a circuit for governing closure of said control circuit by said switch means, means affording a holding circuit for said secondary relay rendered effective by said secondary relay when said secondary relay is operated, said holding circuit having contacts governed by said master relay to release said secondary relay when said master relay releases, an electrical circuit including normally open switch means arranged to be closed when said secondary relay is operated, and means in said last mentioned electrical circuit operable when its circuit is closed to reduce the release period of said master relay.

4. In a control apparatus, a master relay having means effective to impart slow-to-release characteristics thereto affording a normal release period of substantially predetermined length, a secondary relay, a control circuit having switch means therein arranged for closure by said secondary relay when said secondary relay is operated, relay contacts arranged for closure by said master relay and means connecting said relay contacts in a circuit for governing closure of said control circuit by said switch means, means affording a holding circuit for said secondary relay rendered effective by said secondary relay when said secondary relay is operated, said holding circuit having contacts governed by said master relay to release said secondary relay when said master relay releases, an electrical circuit including normally open switch means arranged to be closed when said secondary relay is operated, means including a resistance in said last mentioned electrical circuit operable when its circuit is closed to reduce the release period of said master relay, and means for adjustably varying said resistance to vary the effectiveness of the means which reduces the release time of said master relay.

5. In a control apparatus, a master relay, means including a condenser connected across the coil of said master relay to impart slow-to-release characteristics thereto affording a normal release period of substantially predetermined length, a secondary relay, a control circuit having switch means therein arranged for closure by said secondary relay when said secondary relay is operated, relay contacts arranged for closure by said master relay and means connecting said relay contacts in a circuit for governing closure of said control circuit by said switch means, means affording a holding circuit for said secondary relay rendered effective by said secondary relay when said secondary relay is operated, said holding circuit having contacts governed by said master relay to release said secondary relay when said master relay releases, a resistance, and means including a normally open contact of said secondary relay for connecting said resistance across the coil of said master relay in parallel with said condenser to thereby reduce the release time of said master relay.

6. In a control apparatus, a master relay, means including a condenser connected across the coil of said master relay to impart slow-to-release characteristics affording a normal release period of substantially predetermined length, a secondary relay, a control circuit having switch means therein arranged for closure when said secondary relay is operative, relay contacts arranged for closure by said master relay and means connecting said relay contacts in a circuit for governing closure of said control circuit by said switch means, means affording a holding circuit for said secondary relay rendered effective by said secondary relay when said secondary relay is operated, said holding circuit having contacts governed by said master relay to release said secondary relay when said master relay releases, a resistance, means including a normally open contact of said secondary relay for connecting said resistance across the coil of said master relay in parallel with said condenser to thereby reduce the release time of said master relay, and means for varying said resistance to thereby vary the effectiveness thereof in reducing the release time of said master relay.

7. In a control apparatus, a master relay having means effective to impart slow-to-release characteristics thereto affording a normal release period of substantially predetermined length, a secondary relay, a control circuit having switch means therein arranged for closure by said secondary relay when said secondary relay is operated, relay contacts arranged for closure by said master relay and means connecting said relay contacts in a circuit for governing closure of said control circuit by said switch means, means affording a holding circuit for said secondary relay rendered effective by said secondary relay when said secondary relay is operated, said holding circuit having contacts governed by said master relay to release said secondary relay when said master relay releases, a relay coil adapted when energized to urge said master relay toward its release position, and circuit means controlled by said secondary relay and operable when said secondary relay is operated to render said relay coil operative to thereby reduce the release time of said master relay.

8. In a control apparatus, a master relay having means effective to impart slow-to-release characteristics thereto affording a normal release period of substantially predetermined length, a secondary relay, a control circuit having switch means therein arranged for closure by said secondary relay when said secondary relay is operated, relay contacts arranged for closure by said master relay and means connecting said relay contacts in a circuit for governing closure of said control circuit by said switch means, means affording a holding circuit for said secondary relay rendered effective by said secondary relay when said secondary relay is operated, said holding circuit having contacts governed by said master relay to release said secondary relay when said master relay releases, a relay coil adapted when energized to urge said master relay toward its release position, means controlled by said secondary relay and operable when said secondary relay is operated to render said relay coil operative to thereby reduce the release time of said master relay, and an adjustable resistance in circuit with said relay coil for varying and adjusting the effectiveness of said relay coil in reducing the release time of said master relay.

9. In a control apparatus, a master relay having means effective to impart slow-to-release characteristics affording a normal release period of substantially predetermined length, a pair of secondary relays, a first control circuit having a first switch means therein arranged for closure by a first one of said secondary relays when said first one of said secondary relays is operated, relay contacts arranged for closure by said master relay and means connecting said relay contacts in a circuit for governing closure of said first control circuit by said first switch means, means affording a holding circuit for said one of said secondary relays rendered effective by said one of said secondary relays when said one of said secondary relays is operated, said holding circuit having contacts governed by said master relay to release said one of said secondary relays when said master relay releases, a second control circuit having a second switch means therein arranged for closure by the other one of said secondary relays when said other one of said secondary relays is operated, and means connecting said relay contacts in a circuit for governing closure of said second control circuit by said second switch means, means affording a second holding circuit for said other one of said secondary relays arranged for closure by said other one of said secondary relays when said other one of said secondary relays is operated, said second holding circuit having contacts governed by said master relay to release said other one of said secondary relays when said master relay releases, and means rendered operative selectively by said secondary relays when one of said secondary relays is operated for reducing the release period of said master relay.

10. In a control apparatus, a master relay of the balanced type including a master switch and two opposed relay coils one of which is operable when energized to close said master switch and constitutes a master relay coil having slow-to release characteristics affording a normal release period of substantially predetermined length and the other coil of which is operable when energized during a release period of said master relay coil to reduce the release period thereof, a secondary relay of the balanced type having two opposed relay coils, a pair of control circuits having individual switch means therein arranged for selective closure when one of the coils of said secondary relay is selectively energized during a release period of said master relay coil, means affording individual holding circuits for said secondary relay coils operated and governed by said master relay to open such holding circuits when said master relay releases, and an energizing circuit means for said other relay coil of said master relay arranged for closure by said secondary relay when said secondary relay is operated for reducing the release period of said master relay coil.

11. In a control apparatus, a master relay including a master switch and a relay coil which is operable when energized to close said master switch and constitutes a master relay coil having slow-to-release characteristics affording a normal release period of substantially predetermined length, electrical means operable to reduce the release period thereof of said master relay coil, a secondary relay of the balanced type having two opposed relay coils, a pair of control circuits having individual switch means therein arranged for selective closure when the coils of said secondary relay are selectively energized during a release period of said master relay coil, means affording individual holding circuits for said secondary relay coils rendered effective when said secondary relay coils are operated and governed by said master relay to open such holding circuits when said master relay releases, and circuit means for said electrical means arranged for closure by said secondary relay when said secondary relay is operated for reducing the release period of said master relay coil.

12. In a control apparatus, a master relay including a master switch and a relay coil which is operable when energized to close said master switch and constitutes a master relay coil, said master relay coil having means effective to impart slow-to-release characteristics thereto affording a normal release period of substantially predetermined length, a secondary relay of the balanced type having two opposed relay coils and having energizing circuits conditioned for closure only during a release period of said master relay coil, a pair of control circuits having individual switch means therein arranged for selective closure when the coils of said secondary relay are selectively energized, means connecting said master switch in a circuit for governing closure of said control circuits by said switch means, and means affording individual holding circuits for said secondary relay coils rendered effective respectively when a secondary relay coil is operated, said holding circuits each including said master switch so as to be governed by said master relay to open such holding circuits when said master relay releases.

13. In a control apparatus, a master relay having slow-to-release characteristics affording a normal release period of substantially predetermined length, a pair of secondary relays, a first control circuit having switch means therein arranged for closure when a first one of said secondary relays is rendered operative during such a release period of said master relay, means affording a holding circuit for said one of said secondary relays rendered effective by said one of said secondary relays when said one of said secondary relays is operated and governed by said master relay to release said one of said secondary relays when said master relay releases, a second control circuit having switch means therein arranged for closure when the other one of said secondary relays is rendered operative during such a release period of said master relay, means affording a holding circuit for said other one of said secondary relays rendered effective when said one of said secondary relays is operated and governed by said master relay to release said other one of said secondary relays when said master relay releases, and means including variable resistances rendered operative selectively by said secondary relays when one of said secondary relays is operated for reducing the release period of said master relay.

ROSSER L. WILSON.

REFERENCES CITED

The following references are of record in the file of this patent:

UNITED STATES PATENTS

| Number | Name | Date |
|---|---|---|
| 1,553,407 | Staege | Sept. 15, 1925 |
| 1,553,408 | Staege | Sept. 15, 1925 |
| 1,731,513 | Wagner | Oct. 15, 1929 |
| 1,835,916 | Wickery | Dec. 8, 1931 |
| 2,200,128 | West | May 7, 1940 |
| 2,213,358 | Berges | Sept. 3, 1940 |
| 2,216,329 | Stansbury | Oct. 1, 1940 |
| 2,232,753 | Wilson | Feb. 25, 1941 |
| 2,232,896 | Wilson | Feb. 25, 1941 |
| 2,246,516 | Herzog | June 24, 1941 |
| 2,254,039 | Kovalsky | Aug. 26, 1941 |
| 2,322,114 | Clare | June 15, 1943 |